(12) United States Patent
Kim et al.

(10) Patent No.: US 12,497,722 B2
(45) Date of Patent: Dec. 16, 2025

(54) CLOTHING TREATMENT APPARATUS

(71) Applicant: LG ELECTRONICS INC., Seoul (KR)

(72) Inventors: Changoh Kim, Seoul (KR); Woore Kim, Seoul (KR); Sangwook Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 602 days.

(21) Appl. No.: 17/911,961

(22) PCT Filed: Mar. 16, 2021

(86) PCT No.: PCT/KR2021/003250
§ 371 (c)(1),
(2) Date: Sep. 15, 2022

(87) PCT Pub. No.: WO2021/187872
PCT Pub. Date: Sep. 23, 2021

(65) Prior Publication Data
US 2023/0145979 A1    May 11, 2023

(30) Foreign Application Priority Data

Mar. 16, 2020  (KR) .................. 10-2020-0032176
Mar. 16, 2021  (KR) .................. 10-2021-0034153

(51) Int. Cl.
*D06F 39/04*     (2006.01)
*D06F 33/34*     (2020.01)
(Continued)

(52) U.S. Cl.
CPC .............. *D06F 33/72* (2020.02); *D06F 33/34* (2020.02); *D06F 33/44* (2020.02); *D06F 34/16* (2020.02);
(Continued)

(58) Field of Classification Search
CPC .......... D06F 33/34; D06F 33/44; D06F 33/72; D06F 39/04; D06F 39/083; D06F 39/087;
(Continued)

(56) References Cited

U.S. PATENT DOCUMENTS

2006/0107468 A1* 5/2006 Urbanet ................ D06F 39/083
8/158
2011/0047717 A1* 3/2011 Cho ........................ D06F 33/36
68/12.02
(Continued)

FOREIGN PATENT DOCUMENTS

CN    1153839 A    7/1997
EP    3 640 389 A1    4/2020
(Continued)

*Primary Examiner* — David G Cormier
(74) *Attorney, Agent, or Firm* — Birch, Stewart, Kolasch & Birch, LLP

(57) ABSTRACT

A clothing treatment apparatus includes a tub for providing a space in which washing water is accommodated; a drum rotatably provided inside the tub; a motor for rotating the drum; and an induction heater which is arranged on the outer surface of the tub and which heats the drum. The motor can rotate the drum at a first rotational speed at which laundry accommodated inside the drum is rotated while adhered to the inner circumferential surface of the drum, during heating of the drum by the induction heater.

14 Claims, 14 Drawing Sheets

(51) Int. Cl.
  *D06F 33/44* (2020.01)
  *D06F 33/72* (2020.01)
  *D06F 34/16* (2020.01)
  *D06F 39/08* (2006.01)
  *H05B 6/10* (2006.01)
(52) U.S. Cl.
  CPC ............ *D06F 39/04* (2013.01); *D06F 39/083* (2013.01); *H05B 6/10* (2013.01)
(58) Field of Classification Search
  CPC ............. D06F 2103/16; D06F 2103/18; D06F 2103/24; D06F 2105/02; D06F 2105/06; D06F 2105/10
  See application file for complete search history.

(56) References Cited

U.S. PATENT DOCUMENTS

| | | | |
|---|---|---|---|
| 2014/0109429 A1 | 4/2014 | Wehrheim et al. | |
| 2015/0020318 A1* | 1/2015 | Seo .................. | D06F 23/02 68/12.19 |
| 2018/0148886 A1 | 5/2018 | Kalze et al. | |
| 2019/0048517 A1* | 2/2019 | Park .................. | D06F 58/26 |

FOREIGN PATENT DOCUMENTS

| | | |
|---|---|---|
| KR | 10-2006-0089072 A | 8/2006 |
| KR | 10-2011-0016225 A | 2/2011 |
| KR | 10-2019-0016863 A | 2/2019 |
| KR | 10-2019-0101266 A | 8/2019 |
| WO | WO 2019/164244 A1 | 8/2019 |

\* cited by examiner (a)          (b)

CLOTHING TREATMENT APPARATUS

CROSS REFERENCE TO RELATED APPLICATIONS

This application is the National Phase of PCT International Application No. PCT/KR2021/003250, filed on Mar. 16, 2021, which claims priority under 35 U.S.C. § 119(a) to Patent Application No. 10-2020-0032176, filed in the Republic of Korea on Mar. 16, 2020 and Patent Application No. 10-2021-0034153, filed in the Republic of Korea on Mar. 16, 2021, all of which are hereby expressly incorporated by reference into the present application.

TECHNICAL FIELD

The present disclosure relates to a clothing treatment apparatus, and more particularly, to a clothing treatment apparatus that heats a drum by an induction heater.

BACKGROUND ART

In general, clothing treatment apparatuses may include a washing machine, a dryer, a device for refreshing clothes, and the like. The washing machine may be a washing machine with a drying function.

The washing machine includes a tub (outer tub) for storing washing water and a drum (inner tub) rotatably provided in the tub. Laundry (cloth) may be accommodated in the drum, and as the drum rotates, the cloth is washed by detergent and washing water.

The washing machine may be provided with a heating means for drying the laundry or heating the washing water.

In order to facilitate the activation of the detergent and the decomposition of contaminants to improve the washing effect, high-temperature washing water is supplied into the tub or heated in the tub. In general, a conventional washing machine is provided with a heater mounting part recessed downwardly at a lower part the inside of the tub, and a heater is provided in the heater mounting part. As such a heater, a sheath heater is usually used.

An amount of washing water required for washing may be determined by an amount of washing water required for heater protection water level and an amount of washing water required for soaking.

If the sheath heater is operated while exposed to the air, it may cause the washing machine to malfunction. Therefore, water should be supplied up to the heater protection water level at which the heater is completely submerged, and approximately 6 liters of washing water should be supplied. In a case where there is no cloth, when approximately 6 liters of washing water is supplied to the tub, the heater is completely submerged in the washing water and a lower part of the drum is also submerged in the washing water.

In addition to protecting the heater, more washing water is required for laundry-wetting. In general, an amount of water the clothes holds after watering is about 200% of the clothes weight. Therefore, as the amount of clothes increases, the amount of washing water for laundry-wetting increases. About 6 liters of washing water is required to wet 3 kg of clothes.

When 6 liters of washing water is supplied to protect the heater while the laundry is accommodated in the drum, the laundry absorbs the washing water and the heater may be exposed to the air. Therefore, approximately 12 liters of washing water is required to wash 3 kg of clothes.

In order to improve the washing effect, a washing machine to which a washing water circulation system is applied may be provided. Such a circulation system is a system in which washing water is extracted from the inside of the tub through a circulation pump and then the water is injected back into the drum. Therefore, the circulation system may include a flow path and an injection nozzle forming a circulation path in addition to the circulation pump. Through the circulation system, washing water in which detergent is dissolved is sprayed onto the clothes inside the drum, so that the washing effect can be further improved.

In the washing machine to which the circulation system is applied, washing water may be present on a circulation path from the outside of the tub to the inside of the drum. Therefore, more washing water is supplied by an amount of washing water in the circulation path to meet the heater protection water level.

Approximately 1.5 liters of washing water are additionally required for circulation of washing water. Therefore, more than 13.5 liters of washing water is required to wash 3 kg of clothes. When a level of washing water is sensed using a frequency, a water level frequency at the heater protection water level is approximately 24.7 KHz or less. The higher the water level frequency, the lower the water level.

FIG. 1 illustrates a relationship between a washing step and an operating rate of a drum in a clothing treatment apparatus having a washing water heater and a circulation pump. In the clothing treatment apparatus, the driving of the circulation pump may be synchronized with the driving of the drum in a water supply and soaking section and a main washing section. Accordingly, an operating rate of a motor and an operating rate of the circulation pump may be the same in the water supply and soaking section and the main washing section.

In an initial stage of washing, water supply and soaking are performed, and in this case, the drum may perform a tumbling motion. The laundry is tumbled through rotation of the drum, and the drum RPM during the tumbling is approximately 40 RPM. When about 1.5 liters or more of washing water is supplied after the initial water supply, tumbling starts, laundry-wetting is performed, and water supply is continued.

Since the drum is driven at a rotational speed that causes tumbling of the laundry, clothes inside the drum are lifted and then dropped repeatedly to agitate. Thus, the laundry wetting is facilitated. In addition, in order to further facilitate the laundry-wetting, circulation of washing water may be performed in a laundry-wetting process. Then, water supply and laundry-wetting are performed until the water level of the washing water no longer fluctuates higher than the heater protection water level. That is, laundry-wetting may be performed and finished until the clothes are completely wetted and no longer absorbs washing water.

When water supply and laundry-wetting are completed, a washing water heater is driven to heat the supplied washing water. Rotation of the drum is required to evenly heat the laundry and the washing water. The drum may be able to be rotated at a rotational speed at which the laundry inside is tumbled. When the drum rotates, the washing water may move along the drum and a water surface of the tub may sway. Accordingly, there is a risk that the washing water heater is exposed to the air. Therefore, an operating rate of the motor is designed to a minimum when the washing water is heated. It is designed to have an operating rate of approximately 13%. That is, a time during which the motor is driven in a total time of a heating section may be designed to be approximately 13%. The operating rate in the heating section is relatively low compared to in the laundry-wetting section or the main washing section.

Since the time during which tumbling is performed in the heating section is minimized, the washing effect in the heating section is not sufficient. That is, there is a problem in that the washing time increases as much as the time required for heating, and the heating time cannot be used to secure washing performance.

In addition, when the circulation pump is driven, more than about 1.5 liters of washing water should be additionally supplied, as described above. The greater the amount of washing water, the lower the detergent concentration. The lower the detergent concentration, the lower the washing performance. In addition, there is a risk that the heater protection water level may be destroyed by the driving of the circulation pump and the tumbling operation. Therefore, the operation of the circulation pump is stopped in the heating section. That is, the driving of the circulation pump is not synchronized with the driving of the drum, and an operating rate of the circulation pump in the heating section is 0%.

Recently, research on a washing machine that heats a drum using an induction heater (IH) have been being conducted.

The present applicant has filed a patent application regarding a clothing treatment apparatus having an induction module (Korean Patent Application Publication No. 10-2019-0016859, hereinafter referred to as a 'prior patent'). A washing machine provided with an induction heater may be able to heat a drum using a magnetic field, thereby quickly heating the drum, washing water, and laundry.

However, the prior patent does not disclose a means for reducing a washing time other than rapidly heating the drum using a magnetic field, nor disclose a means for improving washing performance.

SUMMARY

An aspect of the present disclosure is to solve the above and other problems.

Another object of the present disclosure provides a clothing treatment apparatus that performs washing with a small amount of washing water without a limitation to a heater protection water level.

Yet another object of the present disclosure provides a clothing treatment apparatus capable of improving washing performance by using high-concentration detergent water.

Yet another object of the present disclosure provides a clothing treatment apparatus in which a cause of malfunction due to a heater is eliminated regardless of a water level of washing water.

Yet another object of the present disclosure provides a clothing treatment apparatus that applies a mechanical force to laundry in a heating section.

Yet another object of the present disclosure provides a clothing treatment apparatus in which an operating rate of a motor is improved in a heating section.

Yet another object of the present disclosure provides a clothing treatment apparatus in which a drum is rotated at a high speed so that laundry is rotated while adhered to an inner circumferential surface of the drum in a heating section.

Yet another object of the present disclosure provides a clothing treatment apparatus in which not only a drum, washing water, and laundry are heated in a heating section, but also washing for removing contaminants from the laundry is performed.

Yet another object of the present disclosure provides a clothing treatment apparatus in which washing water is circulated in a heating section.

Yet another object of the present disclosure provides a clothing treatment apparatus capable of performing circulation of washing water, laundry-wetting, heating, and washing at the same time.

Yet another object of the present disclosure provides a clothing treatment apparatus capable of applying a mechanical force to laundry when eccentricity of a drum is sensed to enter centrifugal washing.

Yet another object of the present disclosure provides a clothing treatment apparatus capable of improving mechanical power (washing efficiency) by securing a degree of freedom in operating rate of a drum motor of a washing machine.

Yet another object of the present disclosure provides a clothing treatment apparatus capable of performing washing with high-temperature washing water by using an induction heater to perform heating since a water supply step.

In order to achieve the above object, a clothing treatment apparatus according to an aspect of the present disclosure includes an induction heater that does not require a heater protection water level.

A section in which washing water and laundry are heated and a centrifugal washing section in which the laundry is rotated integrally with the drum may overlap in time.

The clothing treatment apparatus includes a drum and a motor rotating the drum.

The clothing treatment apparatus may include a tub. The tub may provide a space for accommodating washing water.

The drum may be rotatably provided inside the tub. The drum may accommodate clothes therein.

The induction heater may heat the drum. The induction heater may be disposed on an outer surface of the tub.

The drum may be rotated at a high speed while the induction heater is being driven.

The motor may rotate the drum at a first rotational speed while the induction heater heats the drum. The first rotational speed may be a rotational speed of the drum rotating while the laundry accommodated in the drum is adhered to an inner circumferential surface of the drum. For example, the first rotational speed may be 300 rpm or more. For example, the first rotational speed may be 400 rpm.

The rotation of the drum at the first rotational speed may be referred to as centrifugal washing.

The clothing treatment apparatus may further include a water supply valve for controlling a water supply line connecting an external water source and the tub.

The clothing treatment apparatus may further include a laundry weight sensing part configured to sense an amount of laundry contained in the drum. The laundry weight sensing part may be a controller that controls driving of the motor. For example, when the motor is rotated at a set laundry weight sensing speed, the laundry weight sensing part may sense the amount of the laundry based on a current applied to the motor. For example, when the drum is stopped while the drum is rotated, the laundry amount sensing part may sense the amount of the laundry based on a current applied to the motor. For example, the laundry weight sensing part may sense the amount of the laundry based on a rotational position of the drum for a time period from a state in which the drum is being rotated to a state in which the drum is stopped. The laundry weight sensing part may sense the amount of the laundry by using various known laundry weight sensing methods.

The water supply valve may supply washing water in an amount corresponding to twice a weight of the laundry accommodated in the drum.

When the drum is heated and rotated at the first rotational speed, the water level of the tub may be lower than a lower part of the drum. For example, the lower part of the drum may be a lowermost part of the drum. For example, the lower part of the drum may be a part located vertically below a center of rotation of the drum.

The water supply valve may supply water to the tub before the drum is rotated at the first rotational speed.

The clothing treatment apparatus may further include a water level sensor configured to sense a water level of the tub, and the water level sensor senses the water level of the tub after the drum is rotated at the first rotational speed.

when the water level of the tub is less than or equal to the set water level after the drum is rotated at a first rotational speed, the water supply valve may supply washing water in an amount sufficient for the water level of the tub to reach a set water level.

The set water level may be lower than the lower part of the drum. For example, the lower part of the drum may be a lowermost part of the drum. For example, the lower part of the drum may be a part located vertically below a center of rotation of the drum.

The motor may be stopped after rotating the drum at the first rotational speed.

The water level sensor may sense the water level of the tub in a section in which the drum is decelerated from the first rotational speed or stopped.

The clothing treatment apparatus may further include a circulation system configured to circulate the washing water of the tub.

The clothing treatment apparatus may further include a circulation nozzle configured to spray washing water into the drum. The clothes processing apparatus may further include a circulation pump for supplying the water discharged from the tub to the circulation nozzle. A circulation passage connecting the tub and the circulation pump and connecting the circulation pump and the circulation nozzle may be further included.

The circulation pump may be driven while the drum is heated and rotated at the first rotational speed. That is, heating, centrifugal washing, and circulation of washing water may overlap in time.

When the circulation pump is driven, the water level of the tub may be lower than the lower part of the drum.

While the drum is heated, the motor may be repeated rotated and stopped. A sum of times for which the motor is rotated while the drum is heated may be greater than a sum of times for the motor is stopped. That is, an operating rate of the motor rotating the drum in a heating section of the drum may be 50% or more. For example, the operating rate of the motor rotating the drum in the heating section of the drum may be 80% or more.

The first rotational speed may be greater than a minimum speed of the drum at which vibration of the tub in response to rotation of the drum can resonate. That is, when the drum is accelerated to the first rotational speed, a resonance section may be passed.

The clothing treatment apparatus may further include an eccentricity sensing part configured to sense unbalance of the drum having the laundry accommodated therein. The eccentricity sensing part may include a vibration sensor configured to sense vibration of the tub. The eccentricity sensing part may sense unbalance of the drum based on the vibration of the tub.

The eccentricity sensing part may include a vibration sensor configured to sense the vibration of the drum. The eccentricity sensing part may sense unbalance of the drum based on the vibration of the tub.

The eccentricity sensing part may be a controller. When the drum is rotated at a constant speed, the controller may sense unbalance of the drum based on a current applied to the motor.

The eccentricity sensing part may be a known means to sense unbalance of the drum.

Even when the eccentricity sensing part senses unbalance of the drum, it is possible to perform washing by providing a mechanical force to the laundry in the drum.

The eccentricity sensing part may sense unbalance of the drum when the laundry is dispersed inside the drum.

The motor may rotate the drum at a second rotational speed lower than the first rotational speed before the drum is rotated at the first rotational speed. The eccentricity sensing part may sense unbalance of the drum when the drum is rotated at the second rotational speed.

The second rotational speed may be a rotational speed of the drum, at which the laundry accommodated in the drum is lifted in response to rotation of the drum and then is rotated to fall off from the inner surface of the drum.

When the drum is rotated at the second rotational speed, the laundry accommodated in the drum may be lifted in response to the rotation of the drum and then falls off from the inner surface of the drum.

For example, the second rotational speed may be 40 rpm or more and 60 rpm or less. For example, the second rotational speed may be 46 rpm.

The motor may accelerate the drum when the eccentricity of the drum is equal to or less than a certain level. In this case, the motor may accelerate the drum to the first rotational speed.

The clothing treatment apparatus may prevent the tub from colliding with a cabinet, forming an exterior of the clothing treatment apparatus, due to vibration caused by the rotation of the drum.

The motor may accelerate the drum from the second rotational speed to the first rotational speed. The eccentricity sensing part may further sense unbalance of the drum in a section in which the drum is accelerated from the second rotational speed to the first rotational speed.

When the eccentricity sensing part senses unbalance of the drum in a section in which the drum is accelerated, the drum may be rotated so that the laundry accommodated therein is rotated while adhered to an inner circumferential surface of the drum. That is, the eccentricity sensing part may sense the eccentricity of the drum when the drum is rotated at a speed greater than or equal to a minimum rotational speed at which the laundry is rotated while adhered to the inner circumferential surface of the drum. For example, the rotational speed of the drum may be 100 rpm or more when the eccentricity sensing part senses unbalance of the drum in a section in which the drum is accelerated.

When the eccentricity sensing part senses the imbalance of the drum in the period in which the drum is accelerated, the rotational speed of the drum may be less than a minimum rotational speed at which the vibration of the tub caused by the rotation of the drum can resonate. For example, the rotational speed of the drum may be less than 200 rpm when the eccentricity sensing part senses unbalance of the drum in a section in which the drum is accelerated.

For example, the rotational speed of the drum may be 150 rpm when the eccentricity sensing part senses unbalance of the drum in a section in which the drum is accelerated.

The clothing treatment apparatus may further include a controller for controlling the induction heater. The controller may control the motor. The controller may rotate the drum at the first rotational speed through the motor while driving the induction heater.

The controller may control the circulation pump. The controller may drive the induction heater and drive the circulation pump when rotating the motor.

The controller may control the water supply valve. The controller may control the water supply valve based on the amount of the laundry in the drum. The controller may control the water supply valve based on the water level of the tub.

The controller may include a laundry weight sensing part configured to sense the amount of laundry contained in the drum.

The controller may include a water level sensor configured to sense the water level of the tub.

In order to realize the above objects, according to an embodiment of the present disclosure, there may be provided a clothing treatment apparatus capable of using high-concentration detergent water by using a high rotational speed centrifugal washing (for example, 400 rpm) without a limit to a heater protection level in a washing process using an induction heater, and a method thereof.

To this end, it is possible to perform sufficient laundry-wetting by using centrifugal washing (400 rpm) and operating a circulation system in a laundry-wetting section.

Since the induction heater can be operated in a centrifugal washing section due to destruction of the heater protection water level, the laundry-wetting section and the heating section may be set as one section.

In this case, an amount of water required for the circulation system (Circulation) may be secured by increasing a drum rotational speed (for example, 400 rpm), so that washing water can be circulated smoothly in a circulation process.

As a specific example for this, the present disclosure provides a control method of a clothing treatment apparatus including: a tub providing a space for accommodating washing water; a drum rotatably provided inside the tub; a motor rotating the drum; an induction heater disposed on an outer surface of the tub and heating the drum, a circulation pump configured to pump washing water in the tub to an upper part of the drum, and the control method may include: a water supply step of supplying wash water into the tub through a water supply valve; a laundry-wetting step of operating the circulation pump to circulate wash water and driving the drum to perform laundry-wetting; a heating step of heating by driving the induction heater; a centrifugal washing step in which the laundry is washed by rotating the drum at a first rotational speed exceeding a rotational speed in a state in which the laundry is attached to the inner surface of the drum; and a main washing step of performing washing by driving the drum.

In this case, durations of the laundry-wetting step, the heating step, and the centrifugal washing step may at least partially overlap each other.

In addition, the first rotational speed may be a rotational speed at which the washing water passes through the laundry while the laundry is adhered to an inner surface of the drum.

In addition, the centrifugal washing step may include a step of sensing unbalance (UB) of rotation of the drum.

In addition, the step of sensing the unbalance may be performed at a rotational speed lower than the first rotational speed.

In addition, the step of sensing the unbalance may be performed at a second rotational speed and a third rotational speed greater than the second rotational speed.

In addition, the second rotational speed may correspond to a rotational speed range at which the laundry is bent, stretched, and falls within the drum.

In addition, the third rotational speed may correspond to a rotational speed in a range greater than or equal to a minimum rotational speed at which the drum can be rotated without colliding with the tub and lower than the first rotational speed.

In addition, the centrifugal washing step may include: a step of rotating the drum at the second rotational speed; a first unbalance sensing step of sensing the unbalance of the drum; and a step of rotating the drum at the third rotational speed.

In addition, the centrifugal washing step may include: a secondary unbalance sensing step of sensing an unbalance of the drum; and a step of washing while rotating the drum at the first rotational speed.

In addition, the laundry-wetting step may further include: a water level sensing step of measuring a water level, and when the measured water level is smaller than a preset circulation water level, an additional water supply step may be performed.

In addition, the circulation water level may be a washing water level formed by an amount of washing water equal to or smaller than an amount of washing water filled in the circulation passage to drive the circulation pump, and the circulation water level may be a level at which a lowest portion of the drum is not submerged in the washing water.

In addition, the additional water supply step may be performed up to the circulation water level.

In addition, in the water level sensing step and the additional water supply step, the drum and the circulation pump may be stopped.

In addition, the driving of the drum in the laundry-wetting step may include driving at the second rotational speed and driving at the third rotational speed.

In addition, in the laundry-wetting step, the driving at the second rotational speed and the driving at the third rotational speed may be sequentially and repeatedly performed.

In addition, the laundry-wetting step may include a circulation operation in which washing water is drawn out from the inside of the tub through the circulation pump and then sprayed back into the drum.

In addition, the circulation operation is performed multiple times, and may be interlocked with the driving of the circulation pump.

In addition, an on-time of the motor for the circulation operation and an on-time of the circulation pump may be the same, and an off-time of the motor for terminating the circulation operation and an off-time of the circulation pump may be the same.

In addition, the washing water level in the heating step may be a water level at which a lowermost part of the drum is not submerged in the washing water.

In another example, the present disclosure may include a tub accommodating wash water; a drum rotatably provided in the tub and having clothes accommodated therein; a motor driving the drum; an induction heater mounted on the tub to heat the drum through induction heating; a circulation pump configured to pump washing water inside the tub and supplying the washing water to the drum; a water supply valve provided to supply wash water into the tub; a water level sensor configured to sense a level of washing water inside the tub; and a controller configured to control operation of the motor, the induction heater, the circulation pump, and the water supply valve.

In this case, the controller may supply water into the tub through the water supply valve, operate the circulation pump to circulate the washing water and drive the drum to perform laundry-wetting, perform a control for heating by driving the induction heater, and controlling centrifugal washing by rotating the drum at a first rotational speed exceeding a rotational speed at which laundry is rotated while adhered to an inner surface of the drum.

In this case, durations of the laundry-wetting, the heating, and the centrifugal washing may at least partially overlap each other.

According to at least one of the embodiments of the present disclosure, since there is no need to maintain a protection water level of a heater while heating is performed, it is possible to perform effective washing with a minimum amount of water that laundry can contain.

It is possible to use high-concentration washing water and improve washing performance.

In addition, as an induction heater is provided, it is possible to prevent malfunction caused by the heater, regardless of a water level of the washing water.

In addition, it is possible to remove contaminants from the laundry while heating the washing water.

In addition, it is possible to improve washing performance and reduce a washing time by removing contaminants from the laundry while heating the washing water.

In addition, as water supply, laundry-wetting, and heating of washing water are performed at the same time, it is possible to reduce a washing time because of higher temperature of the washing water compared to the same energy and achieve energy saving.

In addition, as centrifugal washing is performed by heating the washing water at the same time as the washing water is circulated, it is possible to reduce a washing time, improve washing performance, and achieve energy saving.

In addition, by sensing the eccentricity of the drum when the laundry is rotated at a rotational speed that causes a motion of falling apart from an inner circumferential surface of the drum after the laundry is lifted inside the drum, it is possible to improve washing performance and reduce a washing time.

DESCRIPTION OF EXEMPLARY EMBODIMENTS

Figure 1:
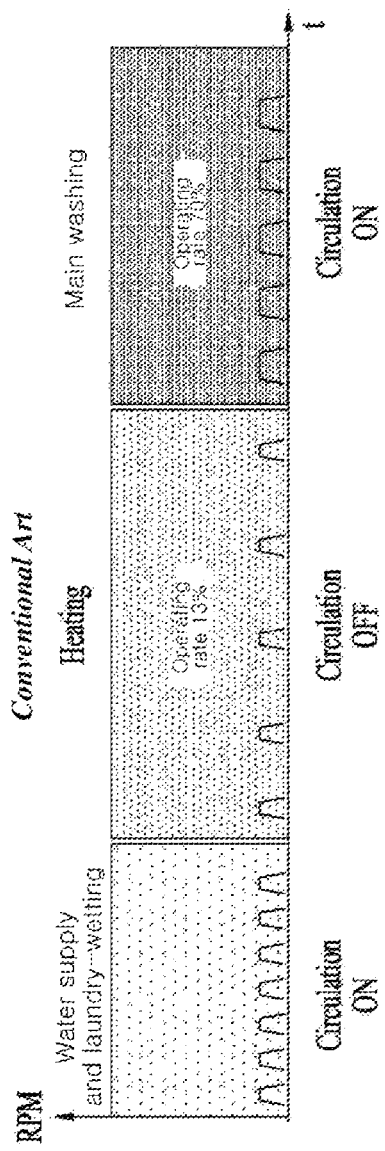
FIG. 1 is a diagram illustrating a relationship between a washing step and an operating rate of a drum in a conventional clothing treatment apparatus having a washing water heater and a circulation pump.

Hereinafter, description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated.

In general, a suffix such as "module" and "unit" may be used to refer to elements or components. Use of such a suffix herein is merely intended to facilitate description of the specification, and the suffix itself is not intended to give any special meaning or function.

In addition, in the following description of the embodiments, a detailed description of known functions and configurations incorporated herein will be omitted when it may impede the understanding of the embodiments. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While terms including ordinal numbers, such as "first" and "second," etc., may be used to describe various components, such components are not limited by the above terms. The above terms are used only to distinguish one component from another.

It will be understood that when an element is referred to as being "connected with" or "coupled to" another element, the element can be connected with or coupled to the other element or intervening elements may also be present. In contrast, when an element is referred to as being "directly connected with" or "directly coupled to" another element, there are no intervening elements present.

As used herein, the singular forms "a," "an" and "the" are intended to include the plural forms as well, unless the context clearly indicates otherwise.

Furthermore, although each drawing is described for convenience of explanation, it is also possible that another embodiment realized by those skilled in the art by combining at least two or more drawings may also falls within the scope of the present disclosure.

In addition, it will be understood that, when an element, such as a layer, a region, or a module, is "on" another element, the element may be located "directly on" the other element and other elements may be interposed between both elements.

Hereinafter, a clothing treatment apparatus and a control method thereof according to an embodiment of the present disclosure will be described in detail with reference to the accompanying drawings.

A clothing treatment apparatus of the present disclosure may correspond to a washing machine, a dryer, and a dryer-integrated washing machine. Hereinafter, a washing machine will be described as a representative example of the clothing treatment apparatus of the present disclosure. However, the clothing treatment apparatus of the present disclosure is not limited thereto.

Hereinafter, a washing machine according to an embodiment of the present disclosure will be described with reference to FIGS. 2 to 4.

Figure 2:
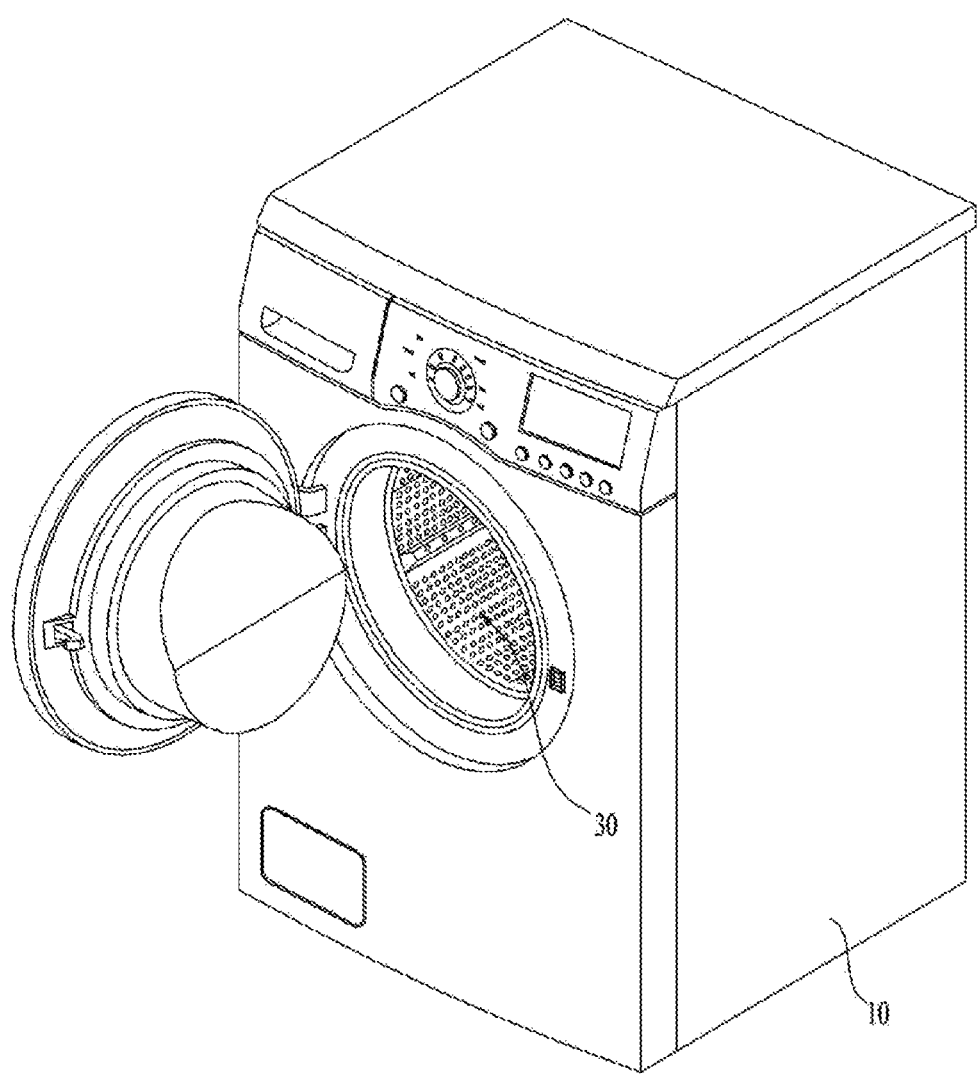
FIG. 2 is a perspective view illustrating an exterior of a clothing treatment apparatus according to an embodiment of the present disclosure.

FIG. 2 is a perspective view illustrating an exterior of a washing machine according to an embodiment of the present disclosure. FIG. 3 is a cross-sectional view illustrating an inside of a washing machine according to an embodiment of the present disclosure. FIG. 4 is a conceptual diagram in which a separate-type induction heater module is mounted on a tub.

A washing machine according to an embodiment of the present disclosure may include a drum 30 and an induction heater 70 provided to heat the drum 30. The washing machine may further include a cabinet 10 forming an exterior. The washing machine may further include a tub 20.

The tub 20 may be provided inside the cabinet 10. The tub 20 may provide an accommodation space. The tub 20 may accommodate washing water. The tub 20 is provided to accommodate the drum 30.

The drum 30 may be rotatably provided inside the cabinet 10. The drum 30 may be rotatably provided inside the tub 20. The drum 30 accommodates laundry. An opening is provided at a front of the drum 30, and laundry is put into the drum 30.

The drum 30 may include a body in an elongated cylindrical shape and through holes 30h formed in the body. The through holes 30h are formed in a circumferential surface (body of the drum) of the drum 30 to allow air and washing water to communicate with each other between the tub 20 and the drum 30.

The drum 30 may be formed of a conductor. The body of the drum 30 may be formed of a conductor. The body of the drum 30 may be formed of metal.

The induction heater or IH module 70 may heat the drum 30. The induction heater 70 may generate an electromagnetic field. The induction heater 70 is provided to heat the drum 30 using a magnetic field.

The induction heater 70 may be provided on an outer circumferential surface of the tub 20. The induction heater 70 may be provided on the tub 20. The induction heater 70 may be fixed to the tub 20. The induction heater 70 may be spaced apart from the drum 30.

Alternatively, the induction heater 70 may be disposed outside the drum 30 in the cabinet 10. The induction heater 70 may be fixed to an inner wall of the cabinet 10. The induction heater 70 may be spaced apart from the drum 30.

The tub 20 and the drum 30 may be formed in a cylindrical shape. Inner and outer circumferential surfaces of the tub 20 and the drum 30 may be each formed in a substantially cylindrical shape.

Figure 3:
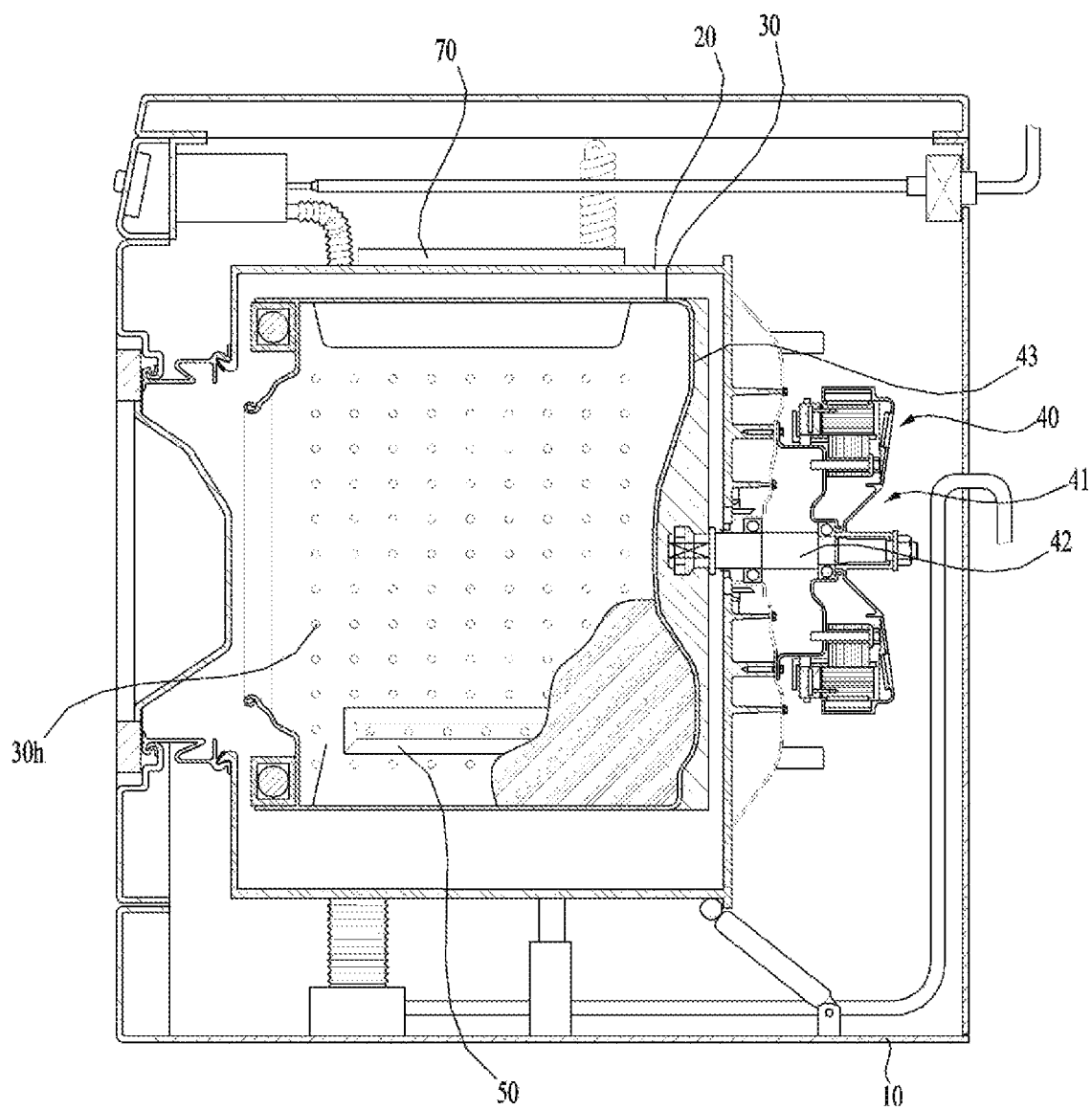
FIG. 3 is a cross-sectional view illustrating an inside of a clothing treatment apparatus according to an embodiment of the present disclosure.

FIG. 3 shows a washing machine in which the drum 30 is rotated with respect to a rotation axis parallel to the ground. Unlike the drawings, the drum 30 and the tub 20 may have a tilting shape that tilts to the rear. The rotating shaft of the drum 30 may pass through the rear surface of the clothing treatment apparatus. That is, a straight line extending from a rotational shaft 42 of a driver 40 may pass through the rear surface of the clothing treatment apparatus.

The clothing treatment apparatus further includes the driver 40 provided to rotate the drum 30 inside the tub 20. The driver 40 may include a motor 41. The motor 41 may include the rotational shaft 42. The rotating shaft 42 may be connected to the drum 30 to rotate the drum 30 in the tub 20 and/or the cabinet 10.

The motor 41 includes a stator and a rotor. The rotor may be connected to the rotational shaft 42. The rotating shaft 42 may be connected to the drum 30 to rotate the drum 30 in the tub 20.

The driver 40 may include a spider 43. The spider 43 may be an element that connects the drum 30 and the rotational shaft 42 and uniformly and stably transmits a rotational force of the rotational shaft 42 to the drum 30.

The spider 43 may be coupled to the drum 30 while at least partially inserted into a rear wall of the drum 30. To this end, the rear wall of the drum 30 is formed in a shape recessed inward of the drum 30. In addition, the spider 43 may be coupled to the drum 30 while further inserted into the drum 30 at a center of rotation of the drum 30.

A lifter 50 may be provided inside the drum 30. A plurality of lifters 50 may be provided along the circumferential direction of the drum 30. The lifter 50 performs a function of agitating the laundry. For example, in response to rotation of the drum 30, the lifter 50 lifts the laundry upward.

The laundry moved upward is separated from the lifter 50 due to gravity and falls downward. Washing may be performed by an impact force caused by the falling of the laundry. The agitation of laundry may enhance drying efficiency.

The lifter 50 may be formed by extending from a rear end of to a front end of the drum 30. The laundry may be evenly distributed back and forth in the drum 30.

An induction heater IH (which is also referred to as an IH module) 70 is a device for heating the drum 30.

Figure 4:
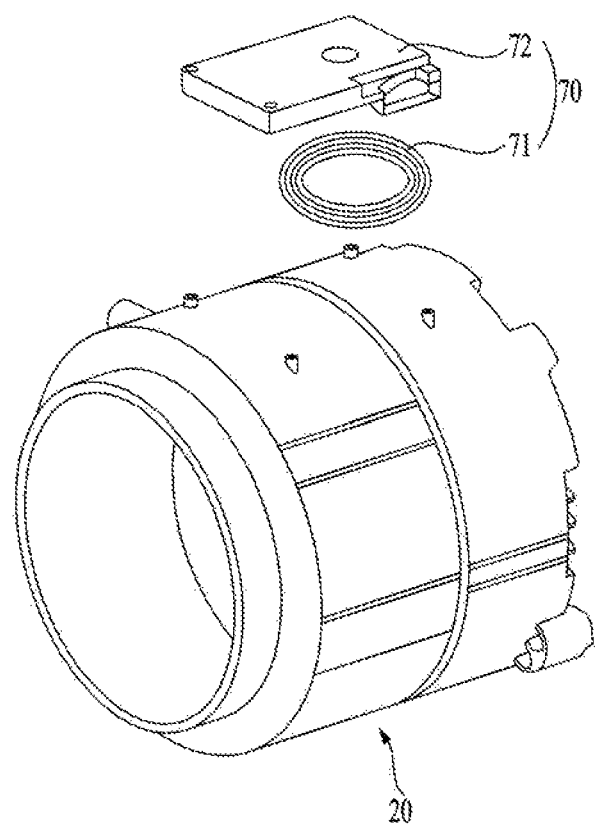
FIG. 4 is a conceptual diagram in which a separate-type induction heater module is mounted on a tub.

As shown in FIG. 4, the induction heater 70 may include a coil 71 that receives a current to generate a magnetic field. The coil 71 may generate an eddy current in the drum 30.

The induction heater 70 may include a heater cover 72 that accommodates the coil 71. Descriptions about the structure of the induction heater 70 and the principle on how the induction heater 70 heats the drum 30 will be omitted.

In the clothing treatment apparatus, the coil 71 heats the drum 30 to increase temperature inside the drum 30 as well as the drum 30 itself. The induction heater 70 may heat the washing water in contact with the drum 30 by heating the drum 30. The induction heater 70 may heat the laundry in contact with an inner circumferential surface of the drum 30. The induction heater 70 may heat the laundry that is not in contact with the inner circumferential surface of the drum 30 by increasing the temperature inside the drum 30.

The induction heater 70 may increase the washing water, laundry, and ambient temperature inside the drum 30. The induction heater 70 may dry the laundry by increasing temperature of the laundry, temperature of the drum 30, and the ambient temperature inside the drum 30.

Although FIG. 4 shows that the induction heater 70 is provided at an upper side of the tub 20, it does not exclude that the induction heater 70 is provided on at least one of the upper side, lower side, and both sides of the tub 20. The induction heater 70 may be installed at a position higher than a maximum water level for the wash water stored in the tub 20.

Furthermore, the clothing treatment apparatus such as a dryer may not include the tub 20, and the induction heater 70 may be installed at an inner wall of the cabinet 10.

The induction heater 70 may be provided at one side of the outer circumferential surface of the tub 20. The coil 71 may be provided by winding the induction heater 70 in the cover 72 at least once along a surface adjacent to the tub 20.

The induction heater 70 may generate an eddy current in the drum 30 by radiating an induced magnetic field directly on the outer circumferential surface of the drum 30, and consequently may directly heat the outer circumferential surface of the drum 30.

The clothing treatment apparatus according to an embodiment of the present disclosure may include a controller 90 (see FIG. 5) for controlling an output of the induction heater 70. The controller 90 may control turning on/off and output of the induction heater 70.

The induction heater 70 may receive power by being connected to an external power supply source via an electric wire. Alternatively, the induction heater 70 may be connected to the controller 90, which controls the operation of the washing machine, to receive power. The induction heater 70 may receive power from anywhere as long as the induction heater 70 is able to supply power to an internal coil 71.

When electric power is supplied to the induction heater 70 and AC current flows through the coil 71 provided in the induction heater 70, the drum 30 is heated.

When electric power is supplied to the induction heater 70 but the drum 30 does not rotate, only some surface portions of the drum 30 is heated, and thus, the corresponding portions may be overheated and the remaining portions of the drum 30 may not be heated or may be less heated In addition, heat may not be smoothly supplied to the laundry accommodated in the drum 30.

When the induction heater 70 is operated, the controller 91 may rotate the drum 30 through the motor 41 of the driver 40. The controller 85 may cause the induction heater 70 to operate once the drum 30 is rotated.

If all of the outer circumferential surface of the drum 30 can face the induction heater 70, a speed at which the motor 41 of the driver 40 rotates the drum 30 may be any speed.

Meanwhile, as the drum 30 is rotated, all surfaces of the drum 30 may be heated, and the laundry inside the drum 30 may be evenly exposed to heat.

Accordingly, in the clothing treatment apparatus according to an embodiment of the present disclosure, even in a case where the induction heater 70 is installed at only one of the upper, lower, and both sides of the outer circumferential surface of the tub 20, it is possible to evenly heat the outer circumferential surface of the drum 30.

According to an embodiment of the present disclosure, the induction heater 70 may heat the drum 30 to a high temperature within a very short time. The induction heater 70 may heat the drum 30 to a target temperature within a very short time. The induction heater 70 may heat the drum 30 to 120° C. or higher within a very short time.

When the induction heater 70 is driven while the drum 30 is in a stationary state or at a very slow rotational speed, a specific part of the drum 30 may be overheated very quickly. When the induction heater 70 is driven in a state in which the drum 30 is stopped or at a very slow rotating speed, heat may not be sufficiently transferred from the heated drum 30 to the laundry A correlation between the rotating speed of the drum 30 and the driving of the induction heater 70 may be very important. It may be more advantageous to rotate the drum 30 and drive the induction heater 70 than to drive the induction heater 70 and rotate the drum 30.

Through the description of the above-described embodiment, it can be seen that the washing machine according to the embodiment of the present disclosure can save washing water because it is not necessary to completely submerge laundry in the washing water in order to soak the laundry. This is because a portion of the drum 30 in contact with the washing water continuously changes as the drum 30 is rotated. That is, this is because a heated portion repeatedly comes into contact with the washing water to heat the washing water and is then separated from the washing water and heated.

In addition, through the description of the above-described embodiment, it can be seen that the washing machine according to the embodiment of the present disclosure can increase temperature of laundry and an internal space in which the laundry is accommodated. That is, this is because the drum 30 in contact with the laundry is heated. Therefore, it is possible to effectively heat the laundry without being submerged in the washing water.

In one example, since the laundry does not need to be submerged in the washing water for sterilization, it is possible to save the washing water. This is because the laundry may be heated through the drum 30 rather than through the washing water. In addition, the inside of the drum 30 changes to a high temperature and high humidity environment due to steam or water vapor generated as wet laundry is heated, so that the sterilization effect can be more effectively performed.

Therefore, a laundry sterilizing washing course in which washing water is submerged in heated washing water may be replaced with a method using a much smaller amount of washing water. In other words, since it is not necessary to heat washing water having a high specific heat, it is possible to save energy.

In addition, through the description of the above-described embodiment, it can be seen that an amount of washing water supplied to increase temperature of laundry may be reduced, and thus a time to supply the washing water may be reduced. This is because it is possible to reduce the amount and time for additionally supply of washing water after laundry-wetting. Therefore, a washing time may be further reduced.

Here, a water level of washing water with detergent contained therein may be lower than a lowest water level of the drum 30. In this case, by supplying the washing water inside the tub 20 to the inside of the drum 30 through a circulation pump 80, it is possible to more effectively use a small amount of washing water. The supply of washing water through the circulation pump 80 may be performed through the controller 90.

Furthermore, through the description of the above-described embodiment, the configuration of the heater provided under the tub 20 to heat the washing water may be omitted, thereby simplifying the configuration and increasing a volume of the tub 20.

In particular, it can be seen that the heater inside the general tub 20 has a limit in increasing a heating surface area. That is, a surface area of the heater in contact with air or laundry is relatively small. However, on the contrary, a surface area of the drum 30 itself or a surface area of a circumferential surface of the drum 30 itself is very large. Therefore, since a heating area becomes large, an immediate impact of heating may be obtained.

A heating mechanism through the heater of the tub 20 during washing heats the washing water by the heater of the tub 20, and the heated washing water increases temperature of the drum 30, temperature of the laundry, and ambient temperature inside the drum 30. Therefore, it takes a lot of time until the whole is heated to a high temperature.

However, as described above, the circumferential surface of the drum 30 itself has a relatively large area in contact with washing water, the laundry, and the air inside the drum 30. Therefore, the heated drum 30 directly heats the washing water, the laundry, and the air inside the drum 30. Therefore, it can be said that the induction heater 70 as a heating source during washing is very effective compared to a tub heater.

In addition, when the washing water is heated during washing, the drum 30 is generally stopped. This is to drive the tub heater submerged in the washing water while at a stable water level. Therefore, the washing time may be increased by a time required to heat the washing water.

When the washing water is heated using the induction heater 70, the drum may rotate. Accordingly, it is possible to prevent a product damage or malfunction caused in a case where when the drum does not rotate, only a part of the drum is heated and thus the washing water is not heated evenly and the drum is partially heated. In addition, if the washing water is heated while the drum rotates, the detergent may be more efficiently dissolved according to a flow of the washing water, and a time required to heat the washing water may be reduced because a time during which the circumferential surface of the heated drum is in contact with the washing water is increased.

Figure 5:
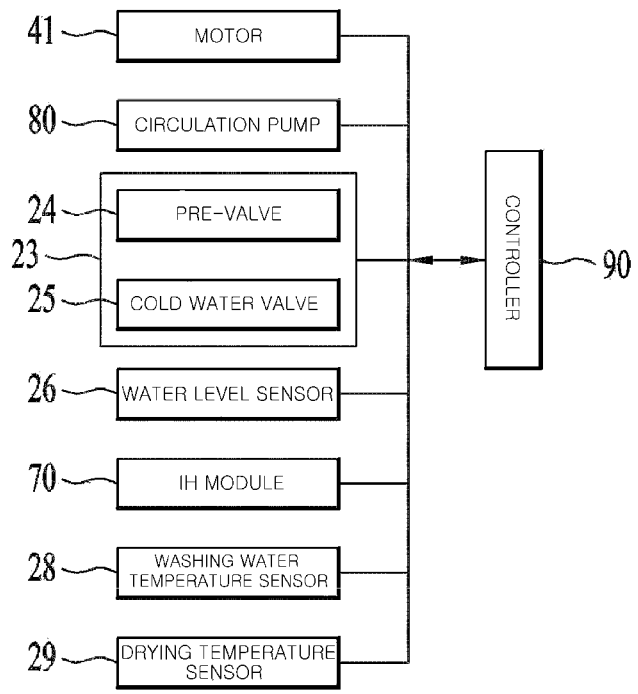
FIG. 5 is a block diagram illustrating a control configuration of a clothing treatment apparatus according to an embodiment of the present disclosure.

FIG. 5 is a block diagram illustrating a control configuration of a clothing treatment apparatus according to an embodiment of the present disclosure.

Hereinafter, a control configuration of a clothing treatment apparatus according to an embodiment of the present disclosure will be described in detail with reference to FIG. 5.

A controller 90 is a main processor and is provided to control the operation of the clothing treatment apparatus. The operation of various control configurations to be described later may be controlled through the controller.

A motor 41 is provided to drive a drum. That is, the motor 41 is provided to rotate the drum. A rotational force of the motor 41 may be directly or indirectly transmitted to the drum. Recently, a direct drive motor in which a rotational force of the motor 41 is directly transmitted to the drum is generally used.

A driving pattern of the drum may vary according to the driving pattern of the motor 41. Therefore, the controller 90 controls the operation of the motor 41 to generate various driving such as a tumbling operation, a filtration operation, and a spin operation the drum. Each operation state of the drum can also be referred to as a motion of the drum.

A time during which the motor is actually driven within a certain time period may be referred to as an operating rate. That is, if the motor is actually driven for only 50 seconds within a 100-second period, an operating rate of the motor may be 50%. Since the motor drives the drum, it can be said that an operating rate of the motor is approximately equal to an operating rate of the drum. In this embodiment, the operating rate of the motor and the operating rate of the drum may be understood to be the same unless otherwise described.

The tumbling operation of the drum may be a driving to causes clothes (laundry) inside the drum to be lifted and then fall as the drum is rotated at approximately 40 to 60 RPM. For example, when the drum is rotated at 46 RPM, the laundry inside the drum may be lifted and then separated from an inner circumferential surface of the drum and fall. It may be a driving in which washing or laundry-wetting is performed by a mechanical force from the fall of the clothes and friction with the drum. It may be a driving that is commonly used because the clothes are agitated in the drum.

The filtration operation of the drum may be said to be a driving in which as the drum is rotated at about 60 RPM or more, the drum and the clothes are integrally rotated while closely contacting the inner circumferential surface of the drum inside the drum. For example, when the drum is rotated at 100 RPM, the laundry inside the drum is spread out on the inner circumferential surface of the drum, and the washing water is separated from the clothes.

The spin operation of the drum may be said to be a driving of centrifugal dehydration of the washing water from the clothes as the drum is rotated at about 800 RPM or more. As the spin operation is performed by a very large centrifugal force in a final process of washing, the entire washing process may end.

Therefore, a rotation RPM of the drum increases in the order of the tumbling operation, the filtration operation, and the spin operation. The spin operation may be said to be a driving to continuously rotate the drum in one direction, and the tumbling operation and the spin operation may be said to be an operation to repeatedly rotating and stopping the drum in the forward and/or reverse directions.

For washing, washing water must be supplied into the tub from the outside of the clothing treatment apparatus. To this end, the clothing treatment apparatus is provided with a water supply valve 23. The water supply valve is connected to an external water supply source, and when the water supply valve is operated, washing water is supplied into the clothing treatment apparatus.

If necessary, a plurality of water supply valves 23 may be provided. A cold water valve 25 for supplying cold water from an external water supply source and a pre-valve 24 for supplying water other than cold water connected to a boiler, such as hot water, by being connected to a boiler may be provided.

When temperature of the washing water is set to room temperature (chilled water or cold water) during washing, heating of the washing water is not required. Therefore, in this case, water supply may be performed only through the cold water valve 25. However, when the temperature of the washing water is set to a constant temperature (25° C., 40° C., etc.) rather than room temperature during washing, the washing water may be supplied through the pre-valve 24 and the cold water valve 25. Of course, in the latter case, the washing water may be supplied only through the cold water valve 25.

Meanwhile, the pre-valve 24 and the cold water valve 25 may be valves for supplying the same cold water. Water supply through the pre-valve 24 may be a case in which water is supplied to the tub through the inside of the drum, and water supply through the cold water valve 25 may be a case in which water is supplied to a tub without passing through the inside of the drum. Of course, it may be vice versa.

In addition, the pre-valve 24 may be a water supply valve for supplying washing water to the tub through a detergent box, and the cold water valve 25 may be a water supply valve for directly supplying washing water into the tub without passing through the detergent box. Of course, it may be vice versa.

Therefore, a plurality of water supply valves may be provided according to temperature of the washing water and a water supply path of the washing water.

A water level sensor 26 may be provided to sense a water level of washing water supplied into the tub. That is, it may be referred to as a sensor for controlling the water level so that an appropriate amount of washing water is supplied.

In general, a frequency sensor for sensing a water level based on a frequency is usually used as the water level sensor 26. A water level is sensed based on a difference in sensed frequency depending on the water level. During washing, the water level sensor 26 senses a water level so that water is supplied between an empty water level and a maximum water level. The maximum water level may be a heater protection water level at which the lower part of the drum is submerged in the washing water, as described above. In general, water is supplied until a water level of the washing water reaches the heater protection water level after the clothes fully absorbs the washing water.

In this embodiment, it can be said that the heater protection water level is destroyed. That is, the heater protection water level may be ignored. Therefore, the maximum water level until which water is supplied may be referred to as a water supply level, not the heater protection water level. The water supply level in this embodiment may be a water level at which the lower part of the drum is submerged in the washing water.

For a frequency sensor, the empty water level may be approximately 25.5 Khz, and the heater protection water level may be approximately 24.7 Khz. Of course, a value of a specific frequency may vary depending on a size of the clothing treatment apparatus, a model of the frequency sensor, and an external environment. However, a fact that the higher the frequency sensed by the frequency sensor, the lower the water level will be equally applied.

The controller 90 controls the operation of the water supply valve 23 based on a water level value sensed by the water level sensor 26.

An induction heater (IH module) 70 may be referred to as a heater that heats the drum by induction. Since the induction heater 70 has been described in detail with reference to the prior patent, a relevant description thereof will be omitted.

When a drum 30 is heated by the induction heater 70, the washing water may be heated. Of course, not only the washing water but also the clothes in contact with the drum 30 may be directly heated. By this heating method, the clothes absorbing the washing water is directly heated, making it possible to increase a heating effect. In addition, since heat is less diffused to the surroundings, the heating efficiency is higher.

When washing, heating by the induction heater 70 may be performed using the washing water temperature sensor 28. That is, when temperature of the washing water reaches a set temperature, the heating may be terminated.

By the induction heater 70, the drum 30 may be heated to about 160° C. in a short time. In one example, temperature of an outer circumferential surface of the drum 30 may increase to 160° C. in about 3 seconds. Therefore, it may be necessary to prevent overheating of the drum 30 or overheating of the induction heater by transferring the heat from the drum 30 to the washing water and clothes.

A drying temperature sensor 29 may be provided to prevent overheating of the drum 30. The drying temperature sensor 29 may be provided to directly or indirectly sense the temperature of the outer circumferential surface of the drum 30. When it is determined through the drying temperature sensor 29 that the drum 30 is overheated, the controller 90 stops the operation of the induction heater.

The washing water temperature sensor 28 may be mounted on a lower portion of the tub 20 to sense the temperature of the washing water. The drying temperature sensor 29 may be mounted on an upper portion of the tub 20 to sense the temperature of the outer circumferential surface of the drum 30. Therefore, it is advantageous that the washing water temperature sensor and the drying temperature sensor are installed at different positions and senses different objects.

The washing water temperature sensor 28 may directly sense the temperature of the washing water. The drying temperature sensor 29 may indirectly sense the temperature of the drum 30, without contacting the drum 30 rotating. Therefore, it is advantageous that the washing water temperature sensor and the drying temperature sensor have different sensing mechanisms or methods.

The washing water temperature sensor 28 may be provided to sense the temperature of the washing water when the drum 30 is stopped. The induction heater 70 may be controlled not to operate when reaching a target temperature. The drying temperature sensor 29 may be provided to sense the temperature of the drum 30 when the drum 30 is rotated. In particular, it may be provided to sense the temperature when the drum 30 is rotated and when the induction heater 70 is operated. Therefore, it is advantageous that the washing water temperature sensor and the drying temperature sensor have different sensing timings.

Based on such a dual sensor configuration, it is possible to provide a safe clothing treatment apparatus and a control method thereof.

An embodiment of the present disclosure may provide a clothing treatment apparatus capable of stably driving the induction heater 70 and a control method thereof. In particular, the driving of the drum 30 and the driving of the induction heater 70 may be interlocked. Specific details of this embodiment will be described later.

In the clothing treatment apparatus and a control method thereof according to an embodiment of the present disclosure, it is possible to effectively perform washing with an amount of washing water significantly less than an amount of washing water required for washing in a related art. That is, washing may be effectively performed only with an amount of washing water up to a water level much lower than the heater protection water level.

In order to perform washing effectively, a sufficient amount of detergent water (washing water in which detergent is dissolved) must be supplied to clothes (laundry). That is, it is preferable that washing is performed in such a way in which the clothes absorb and is separated from the detergent water at the same time. If a part of the clothes is not wet, it is obvious that this part will not be washed. For this reason, it can be said that washing is performed at the heater protection water level in a related art.

However, in an embodiment of the present disclosure, the heater protection water level is not required and washing may be performed at a water level lower than the heater protection water level. That is, washing may be performed with the clothes not being submerged in washing water.

In this case, as the drum 30 is driven, the detergent water absorbed by the clothes is gradually discharged to the tub 20, thereby reducing the washing effect. For this reason, in an embodiment of the present disclosure, a circulation pump 80 for supplying or resupplying detergent water to the clothes may be provided.

The clothing treatment apparatus of the present disclosure may further include a circulation system configured to circulate washing water of the tub 20.

A circulation nozzle configured to spray washing water into the drum 30 may be provided. The circulation pump 80 may supply the water discharged in the tub 20 to the circulation nozzle. A circulation passage connecting the tub 20 and the circulation pump 80 and connecting the circulation pump 80 and the circulation nozzle may be provided.

The circulation pump 80 may be configured to pump some of the washing water from the lower part of the tub 20 and then spray the pumped washing water into the drum 30. The washing effect may be enhanced by injection pressure of the washing water, and as the washing water (detergent water) is again supplied to the clothes, the clothes may always remain wet enough. Therefore, washing may be effectively performed even if the clothes are not submerged in the washing water.

Washing by the clothing treatment apparatus may be performed through initial water supply, laundry-wetting, heating, and main washing steps or sections. After the main washing, rinsing and spin-drying may be performed to complete washing. The entire washing process or washing course is automatically performed in the order of a washing cycle, a rinsing cycle, and a spin-drying cycle and then ends.

Additional water supply may be performed in the laundry-wetting step. In this embodiment, it is possible to achieve the above-mentioned object, especially when heating is performed in the laundry-wetting step. In addition, in this embodiment, the washing process may be performed in a way such that heating is performed in the laundry-wetting step and the drum is rotated at a high rotational speed. This will be described in detail later.

Characteristics in the washing cycle according to the embodiment of the present disclosure, which will be described later, may equally apply to the rinsing cycle as long as they are not contradictory or exclusive.

Figure 6:
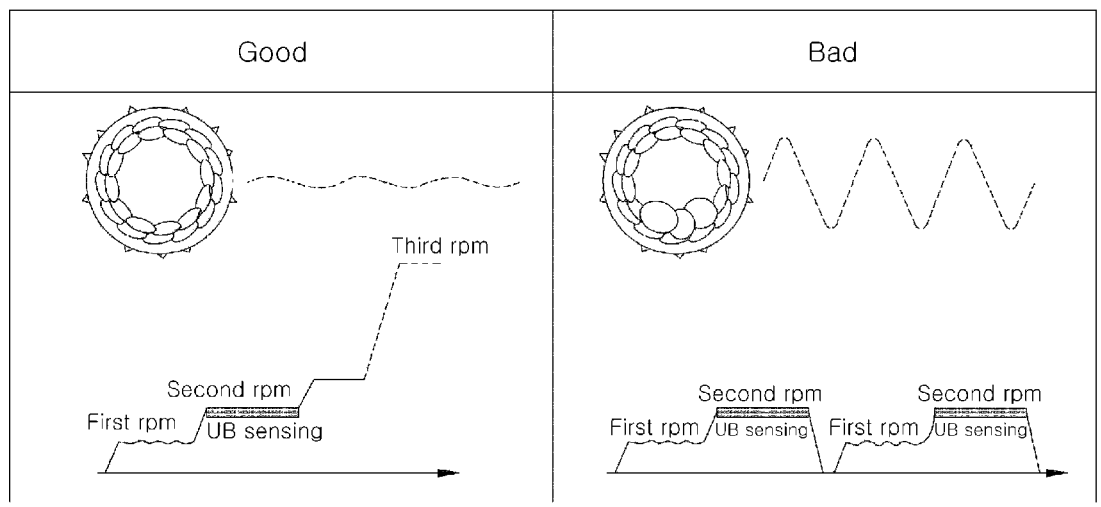
FIG. 6 is a schematic diagram illustrating an example of a state for driving a drum at a high rotational speed in a washing process.

FIG. 6 is a schematic diagram illustrating an example of a state for driving a drum at a high rotational speed in a washing process.

When the drum 30 is rotated at a rotational speed (for example, 100 rpm) that implements a filtration motion, laundry rotates integrally with the drum while adhered to the inner circumferential surface of the drum 30 without falling even from a highest point in the drum 30. When the drum 30 is rotated at a rotational speed that implements the filtration motion while the laundry is wet, water absorbed by the laundry comes out of the laundry due to a centrifugal force.

By rotating the drum 30 at a rotational speed (100 rpm) that implements the filtration motion, the water coming out of the laundry may be utilized in the circulation system. Therefore, the washing machine using the induction heater 70 may perform high-concentration washing with a small amount of water compared to that of general washing.

In the case of washing at a high rotational speed, a smaller amount of water may be used, but if the rotational speed is increased to a certain rotational speed, for example, 100 rpm or more, the tub 20 may vibrate greatly due to the rotation of the drum 30. Therefore, in order to rotate the drum 30 at 100 rpm or more, it is necessary to sense unbalance (UB) of rotation of the drum. Conventionally, the eccentricity of the drum 30 rotating at 100 to 110 RPM, especially at 108 RPM, is sensed.

That is, in order to perform washing at a high rotational speed, it is necessary to sense unbalance of the laundry at a predetermined rotational speed, and in response to sensing of the unbalance, sense unbalance of the drum again. In this case, there may be a power loss, for example, that the rotational speed is not increased but decreased again in order to sense the unbalance.

In other words, if a requirement is not satisfied at the event of sensing of the unbalance (UB), a process of sensing the unbalance after stopping the drum should be performed again, as shown in the right state of FIG. 6, and thus, power loss may occur.

In addition, when the drum 30 is set to be rotated at 100 RPM or more, the laundry rotates integrally with the drum 30, so that it is not possible to provide a mechanical force due to falling, bending and stretching to the laundry.

This process may lead to degradation in washing performance. Therefore, there is a limitation that a rotational speed of the drum cannot not be increased while laundry-wetting is performed.

However, according to an embodiment of the present disclosure, this limitation may be resolved. In addition, it may be possible to perform washing while rotating the drum at a high rotational speed in the initial stage of washing. Such a high rotational speed may mean a rotational speed (a first rotational speed which is different from the first rpm shown in FIG. 6) at which laundry is able to be washed by rotating the drum so that the laundry (clothes) rotates while being adhered to the inner surface of the drum. In one example, the first rotational speed may be 300 to 400 rpm. In addition, such washing performed while rotating the drum at a high rotational speed may be referred to as "centrifugal washing".

According to an embodiment of the present disclosure, a water supply process of supplying washing water into the tub 20 through the water supply valve 23 may be first performed.

Thereafter, laundry-wetting to perform laundry-wetting by driving the drum 30 while the circulation pump 80 is operated to circulate washing water, heating to perform heating by driving the induction heater 70, and centrifugal washing to perform washing by rotating the drum 30 at the first rotational speed, which exceeds a rotational speed at which laundry rotates while adhered to the inner surface of the drum 30, may be performed. Thereafter, a main washing process of performing washing by driving the drum 30 may be performed.

In this case, durations of the laundry-wetting process, the heating process, and the centrifugal washing process may at least partially overlap each other. As a result, a washing time may be reduced, and a more efficient washing process may be achieved. These processes will be described later in detail.

Figure 7:
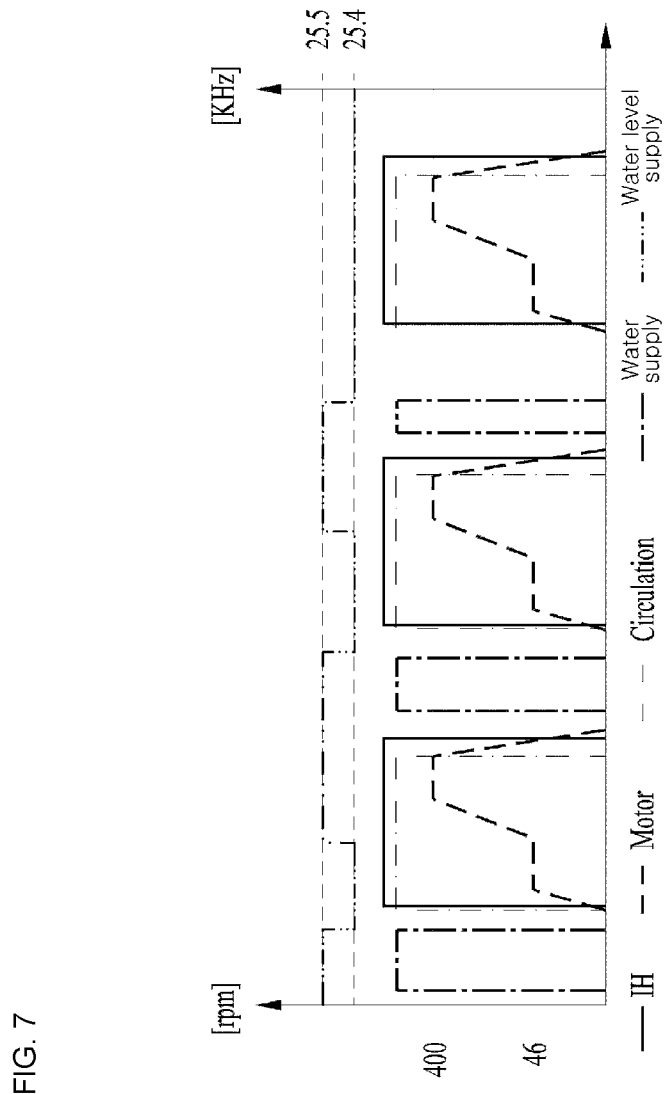
FIG. 7 is a graph illustrating laundry-wetting and heating sections by driving a clothing treatment apparatus according to an embodiment of the present disclosure.

FIG. 7 is a graph illustrating laundry-wetting and heating sections by driving a clothing treatment apparatus according to an embodiment of the present disclosure.

A method for receiving a minimum amount of water required for washing in water supply and laundry-wetting sections according to an embodiment of the present disclosure will be described.

A detergent box providing a space for accommodating detergent may be provided, and the detergent box may be connected to a water supply line.

Initial water supply may be performed by the water supply process. The water supply valve 23 may supply an amount of water that allows the detergent of the detergent box to flow into the tub 20 during the initial water supply. For example, the water supply valve 23 may supply 4 liters of water to the tub during the initial water supply.

Thereafter, the motor 41 and the circulation system may be operated in the laundry-wetting section, shown in FIG. 7, to sufficiently wet the clothes.

In this case, temperature of the clothes may be increased by driving the induction heater (IH module) 70 during the operation of the motor 41.

As shown, the motor 41 may drive the drum 30 at a second rotational speed (for example, 46 rpm) and then increases the rotational speed to the first rotational speed (for example, 400 rpm) to drive the drum 30. As mentioned above, the operation driven at this first rotational speed may be referred to as the centrifugal washing process or a part of the centrifugal washing process. This part of this centrifugal washing process may correspond to a circulation operation by the circulation system.

Meanwhile, the second rotational speed may correspond to a rotational speed range at which the laundry (clothes) is bent and stretched and falls within the drum 30. A motion in which the laundry (clothes) is bent and stretched and falls within the drum 30 may be referred to as a tumble process.

When this operation (driving at the first rotational speed) ends, the driving of the induction heater 70 may end and the motor 41 and a circulation operation may be stopped.

As such, a water level frequency may be checked whenever the motor 41 and the circulation operation are finished, and if there is insufficient or no water (for example, when the water level frequency is 25.5 kHz), an additional water supply process may be performed.

After that, if it is found there is enough water by checking the water level frequency (for example, when the water level frequency reaches 25.4 kHz), the additional water supply process may end with a minimum amount of water clothes contain during washing.

The induction heater 70 may be driven only when the motor 41 is rotated at a predetermined rotational speed or more, for example, 40 rpm or more.

Figure 8:
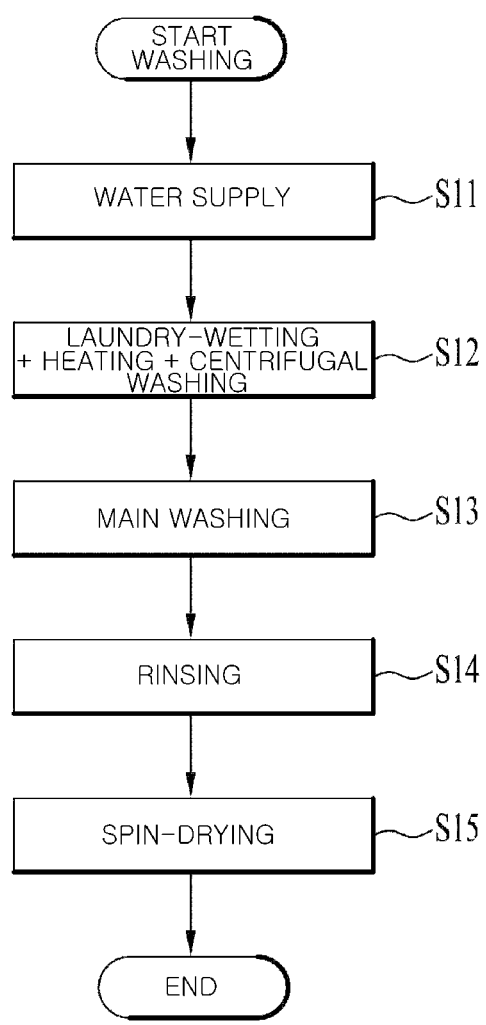
FIG. 8 is a flowchart illustrating a control method of a clothing treatment apparatus according to an embodiment of the present disclosure.
Figure 9:
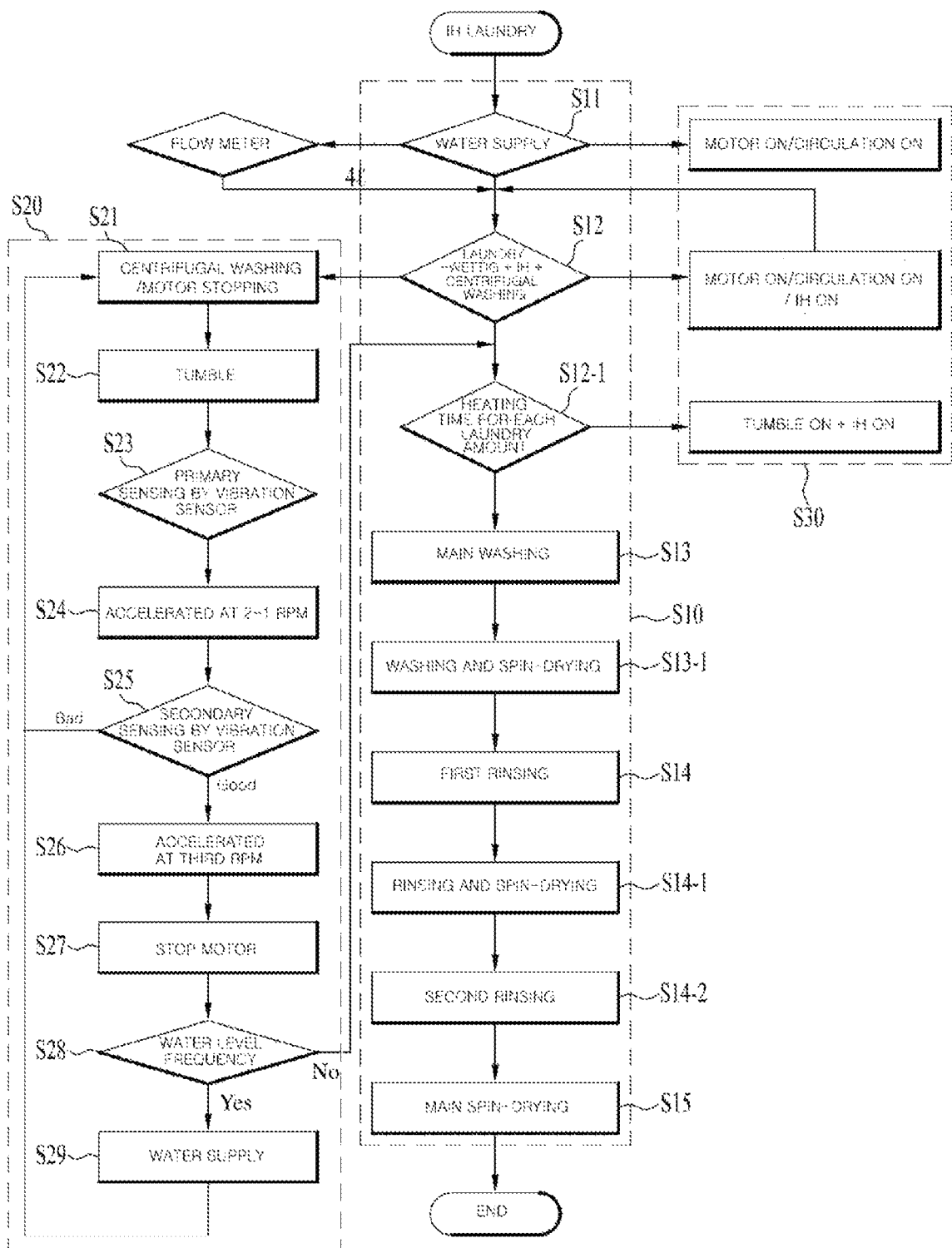
FIG. 9 is a flowchart illustrating a detailed control method of a clothing treatment apparatus according to an embodiment of the present disclosure.

FIG. 8 is a flowchart illustrating a control method of a clothing treatment apparatus according to an embodiment of the present disclosure. Also, FIG. 9 is a flowchart illustrating a detailed control method of a clothing treatment apparatus according to an embodiment of the present disclosure. For the configuration of the clothing treatment apparatus, the configuration of FIGS. 2 to 5 described above may be referred to together.

Hereinafter, a control method of a clothing treatment apparatus according to an embodiment of the present disclosure will be described in detail with reference to FIGS. 8 and 9.

A washing process shown in FIG. 8 may correspond to a main washing process excluding processes such as motor and vibration sensing. This main washing process is illustrated in operation S10 in FIG. 9. In FIG. 9, step S30 of driving a motor, a circulation system, and an induction heater (IH) involved in the main washing process is shown on the right side. In addition, in FIG. 9, a detailed operation S20 of laundry-wetting, driving the heater, and performing centrifugal washing is shown on the left side.

First, a water supply step S11 of supplying washing water into the tub 20 may be performed. This water supply step S11 may be performed through the water supply valve 23. Details of this water supply step S11 will be omitted.

Thereafter, a step S12 may be performed, which includes a time during which laundry-wetting for wetting laundry by driving the drum 30 while circulating washing water, heating for heating by driving the induction heater 70, and centrifugal washing for performing washing by rotating the drum 30 at a first rotational speed exceeding a rotational speed at which the laundry is rotated while adhered to an inner surface of the drum 30 are included.

That is, at least one of a laundry-wetting step to perform laundry-wetting, a heating step to perform heating by driving the induction heater 70, and a centrifugal washing step to perform washing by rotating the drum 30 at the first rotational speed may be simultaneously performed.

In other words, the durations of the laundry-wetting step, the heating step, and the centrifugal washing step may at least partially overlap each other.

In this case, the first rotational speed may be a rotational speed at which washing water permeates (passes through) laundry with the laundry rotating while adhered to the inner surface of the drum 30.

As mentioned above, according to the embodiments of the present disclosure, it may be possible to perform washing while rotating the drum at a high rotational speed in the initial stage of washing. Such a high rotational speed may refer to a rotational speed (first rotational speed) at which washing can be performed by rotating the drum so that the laundry (clothes) is rotated while adhered to the inner surface of the drum. For example, the range of the first rotational speed may be 300 to 400 rpm. In addition, such washing performed while rotating the drum at a high rotational speed may be referred to as "centrifugal washing".

In general, when the rotational speed of the drum 30 is 80 rpm or more, the clothes may be rotated while being adhered to the drum. This may be commonly referred to as filtration or centrifugal operation.

The washing operation based on bending, stretching and falling may be an operation to directly remove contaminants from the clothes, and in the above-mentioned filtration or centrifugal operation, when the clothes are rotated while adhered to the drum 30, the clothes opens up, and at this point, it is possible to quickly and evenly wet the inside of the clothes with detergent water using the circulation system, thereby enhancing the effect of laundry socking.

The range of the first rotational speed described above may mean a rotational speed range in which the washing water pass through the clothes as well as being adhered to the drum. In addition, the range of the first rotational speed may correspond to a dewatering profile. In this case, the range of the first rotational speed may be 300 to 400 rpm.

Meanwhile, the tub 20 may vibrate in response to the rotation of the drum 30. If a rotational speed of the drum 30 is increased, resonance may occur near a natural frequency. The tub 20 may collide with the cabinet 10 due to the resonance.

Resonance may occur at a rotational speed of 200 to 400 RPM of the drum 30. The first rotational speed may be greater than a minimum rotational speed of the drum at which resonance may occur.

As such, in order to increase a rotational speed of the drum 30 to the first rotational speed, a process of sensing unbalance (UB) of rotation of the drum 30 may be required.

That is, the centrifugal washing step may include a step S23 of sensing unbalance (UB) of rotation of the drum 30. The step S23 of sensing unbalance may be performed at a rotational speed lower than the first rotational speed.

For example, the step S23 of sensing unbalance may be performed at a second rotational speed and a third rotational speed greater than the second rotational speed. In this case, the second rotational speed may correspond to a rotational speed range in which the laundry are bent and stretched and falls within the drum 30. That is, the second rotational speed may correspond to tumbling. This tumbling may correspond to 40 to 50 rpm. In an embodiment of the present disclosure, it may be 46 rpm as an example.

In addition, the third rotational speed may be greater than or equal to the minimum rotational speed of the drum 30 at which the drum rotates in a state in which the laundry accommodated in the drum 30 is adhered to the inner circumferential surface of the drum 30. The third rotational speed may be less than the minimum rotational speed at which vibration of the tub 20 caused by the rotation of the drum 30 can resonate. The third rotational speed may correspond to a rotational speed in a lower range than the first rotational speed. For example, the third rotational speed may be 100 RPM or more and less than 200 RPM. For example, the third rotational speed may be 150 rpm.

As described above, referring to FIG. 9, the centrifugal washing step S12 may include (tumbling) step S22 of rotating the drum at the second rotational speed, primary unbalance sensing step S23 of sensing unbalance of the drum 30, and step S24 rotating the drum at the third rotational speed (indicated as 2-1 rpm in order in FIG. 9).

In addition, the centrifugal washing step S12 may further include secondary unbalance sensing step 25 of sensing unbalance of the drum 30 and step S26 of performing washing while rotating the drum 30 at the first rotational speed (indicated as 3 rpm in the sequence in FIG. 9).

Here, as mentioned above, the first rotational speed may be 300 to 400 rpm, for example, 400 rpm may be used.

After this process is performed, the motor may be stopped in step S27. After a water level is sensed in step S28, additional water supply may be performed in step S29.

In this way, the laundry-wetting step may further include water level sensing step S28 of measuring a water level. In this case, when the measured water level is less than a preset circulation water level, additional water supply step S29 may be performed.

In addition, the circulation water level may be a washing water level formed by an amount of washing water equal to or smaller than an amount of washing water filled in the circulation passage to drive the circulation pump, and the circulation water level may be a level at which a lowest portion of the drum 30 is not submerged in the washing water.

In this case, the additional water supply step S29 may be performed until the water level reaches the circulation water level.

In addition, in the water level sensing step S28 and the additional water supply step S29, the driving of the drum 30 and the circulation pump may be stopped. That is, right before the water level sensing step S28 and the additional water supply step S29, the motor may be stopped in step S27.

Thereafter, this process may be repeatedly performed.

This process may be approximately as the same as the process described with reference to FIG. 7.

Referring to FIG. 9, a motor and a circulation system may operate in the water supply step S11.

In addition, in step S12 in which laundry-wetting, heating, and centrifugal washing are performed simultaneously, the induction heater (IH) may operate.

Thereafter, in step S12-1 of determining a heating time for each laundry amount, the drum 30 may perform tumbling and the induction heater IH may operate together.

Thereafter, the main washing process S13 may be performed.

Briefly described with reference to FIG. 8, after the main washing process S13, rinsing process S14 and spin-drying process S15 may be sequentially performed.

Referring to FIG. 9, more specifically, the rinsing S14 and the spin-drying S15 may include washing spin-drying S13-1, first rinsing S14, rinsing and spin-drying S14-1, second rinsing S14-2, and main spin-drying S15. A detailed description thereof will be omitted.

Figure 10:
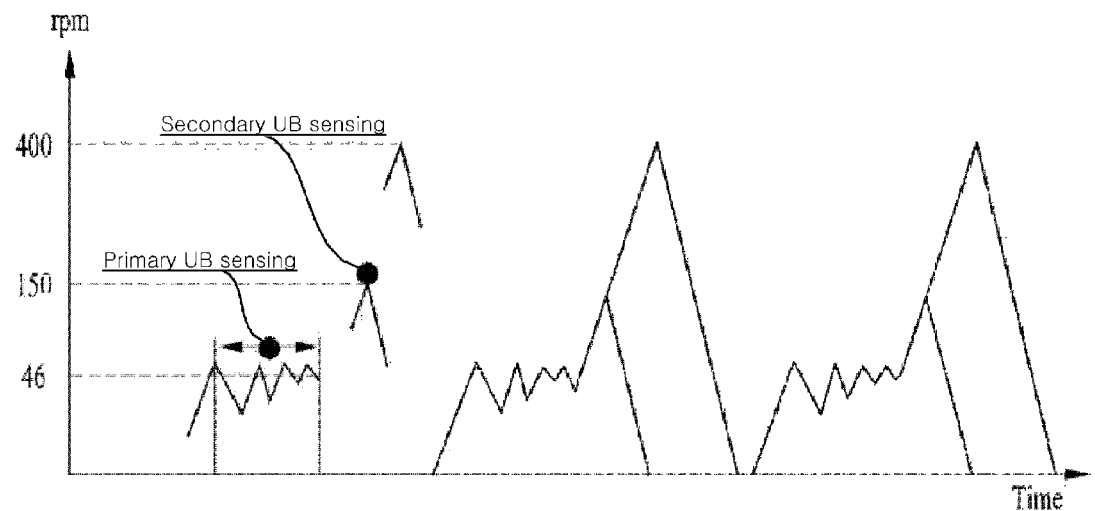
FIG. 10 is a graph illustrating an unbalance sensing process in a control method of a clothing treatment apparatus according to an embodiment of the present disclosure.

FIG. 10 is a graph illustrating an unbalance sensing process in a control method of a clothing treatment apparatus according to an embodiment of the present disclosure.

For centrifugal washing during washing (laundry-wetting), for example, an unbalance sensing process may be primarily performed while securing mechanical performance (washing performance) at 46 rpm.

Then, for example, after a rotational speed of the drum is increased to 150 rpm, the unbalance sensing process may be performed secondarily.

That is, a value of the vibration sensor is measured at 46 rpm, which is a primary unbalance sensing process, and when the value of the vibration sensor reaches a value where clothes can be lifted at a high rpm, the rpm may be increased.

Thereafter, an unbalance value is measured again at about 150 rpm, which is a secondary unbalance sensing process, and when the unbalance value is not satisfactory, the motor may be stopped, and when the unbalance value is satisfactory, the rotational speed may be increased to 400 rpm and then the motor may be stopped.

Figure 11:
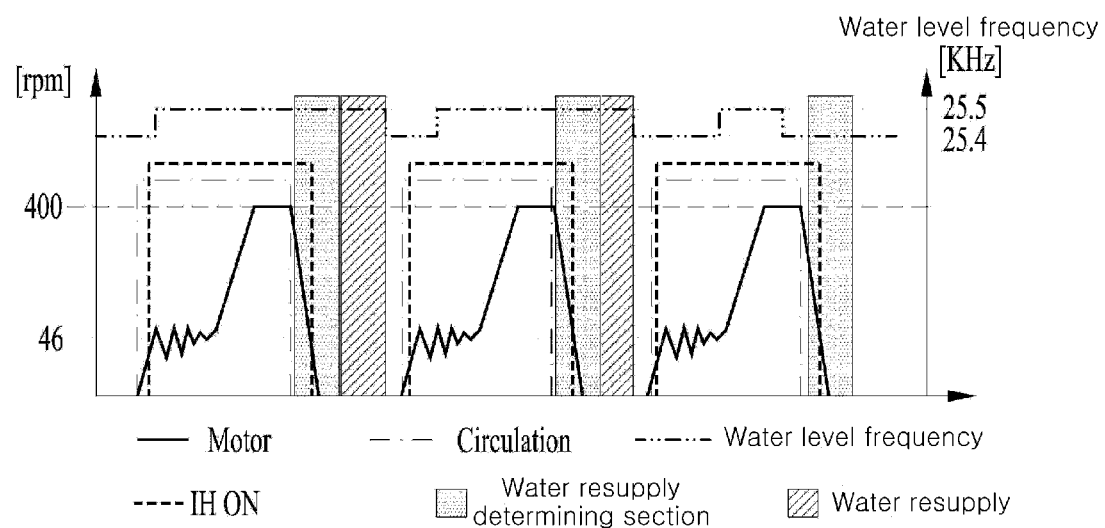
FIG. 11 is a graph illustrating laundry-wetting and heating sections to which an unbalance sensing process is applied in a control method of a clothing treatment apparatus according to an embodiment of the present disclosure.

Referring to FIG. 11, laundry-wetting, heating of washing water, and centrifugal washing may overlap in time.

When the motor 41 is operated, temperature of clothes may be increased by driving the induction heater 70. When the motor 41 is operated and the induction heater 70 is driven, the circulation pump 80 may be operated to wet the laundry.

Each time the motor 41 and the circulation operation are finished, a water level frequency may be checked, and if there is not enough water (for example, when the water level frequency is 25.5 kHz), an additional water supply progress may be performed. The water level sensor 26 may sense a water level of the tub 20 in a section in which the motor 41 is decelerated from the first rotational speed. Or, the water level sensor 26 may sense the water level of the tub 20 when the motor 41 is decelerated and stopped. Or, the water level sensor 26 may sense the water level of the tub 20 after the motor 41 is stopped.

After that, if it is found there is enough water by checking the water level frequency (for example, when the water level frequency reaches 25.4 kHz), the additional water supply process may end with a minimum amount of water clothes contain during washing.

Figure 12:
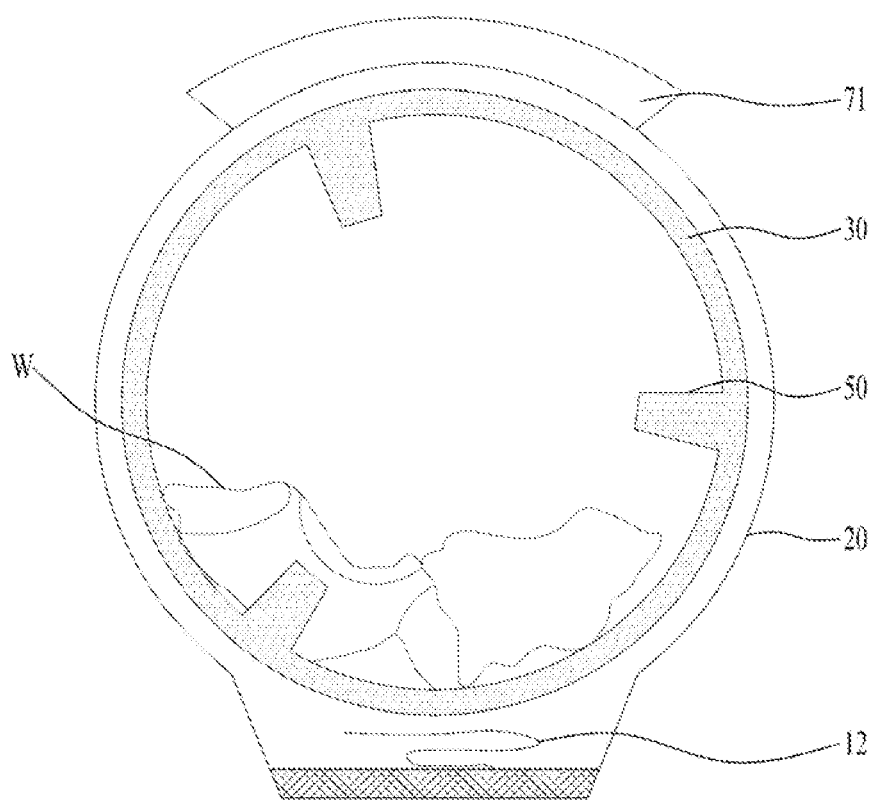
FIGS. 12 to 14 are schematic diagrams illustrating a drum stopping operation, a tumbling operation, and a filtration operation, respectively, in a control method of a clothing treatment apparatus according to an embodiment of the present disclosure.
Figure 13:
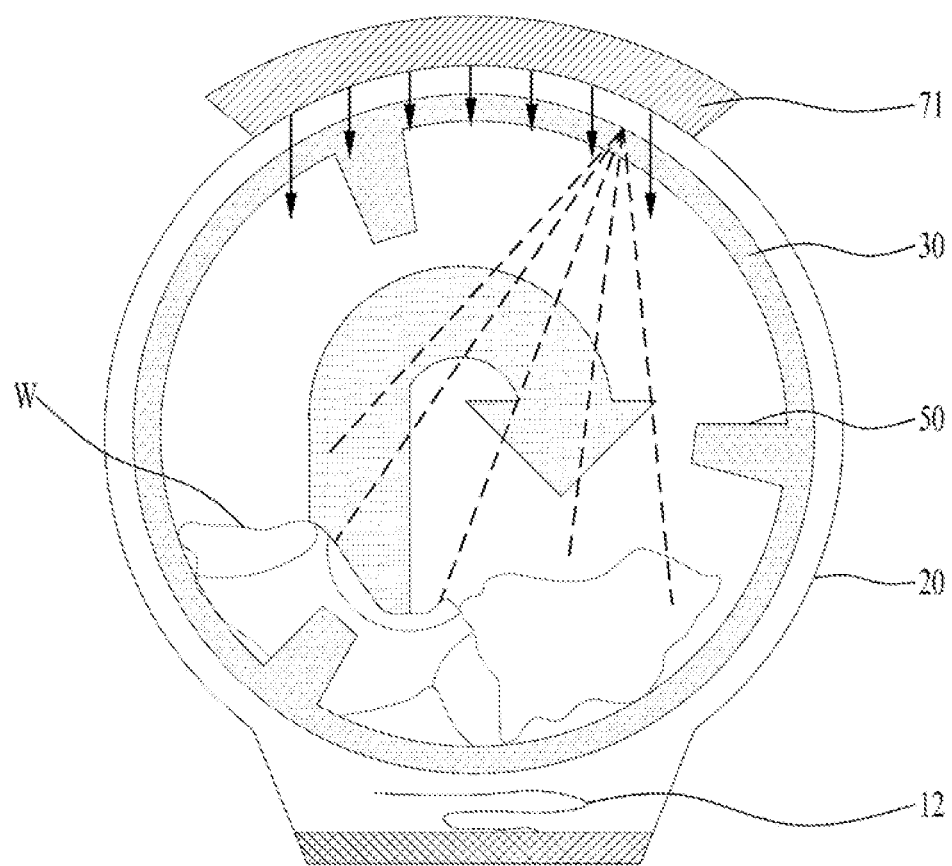
Figure 14:
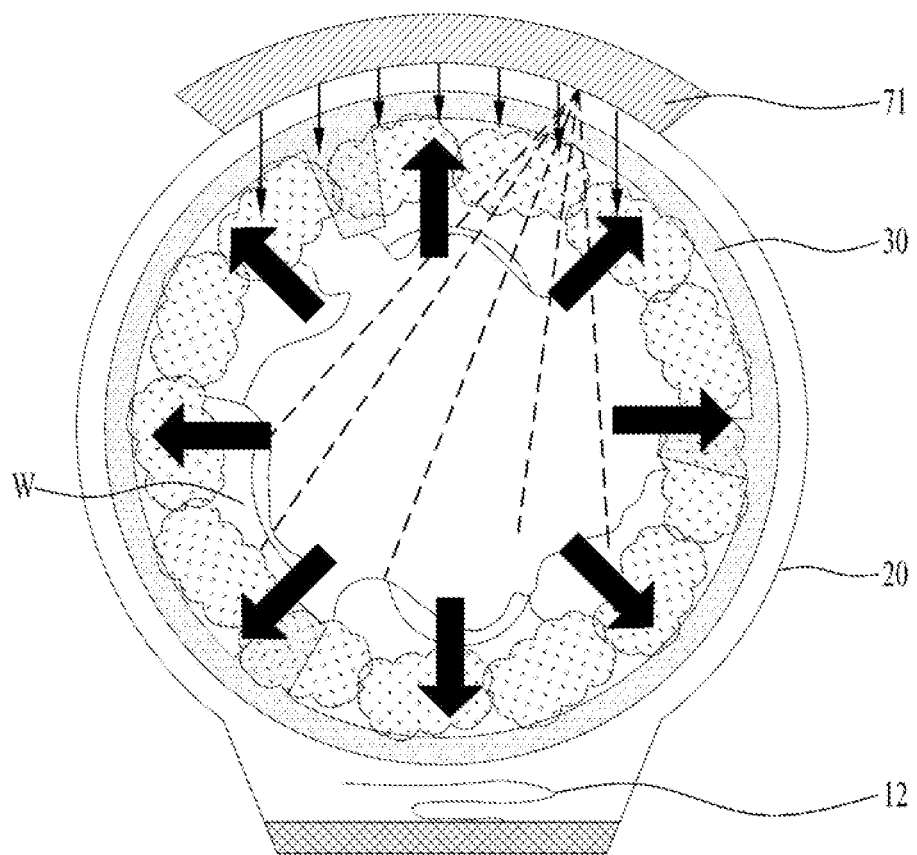

FIGS. 12 to 14 are diagrams illustrating drum stopping, tumbling, and filtration, respectively, in a control method of a clothing treatment apparatus according to an embodiment of the present disclosure.

In this embodiment, as shown in FIGS. 12 to 14, washing water heating is performed using the coil 71 of the induction heater 70, and unless contradictory to this, a sheath heater 12 may also be provided under the tub. That is, the clothing treatment apparatus according to the present embodiment may include both the induction heater 70 and the sheath heater 12 or may include only the induction heater 70. Therefore, as in a related art, a mode in which washing water is heated using the sheath heater 12 may be used, and a mode in which the sheath heater 12 is not operated and the washing water is heated using the induction heater 70 may be used.

As shown in FIG. 13, as the drum 30 is rotated during the tumbling operation, the clothes may be lifted by the lifter 50 and then fall due to gravity, and circulating water may be injected into the drum 30. In addition, the induction module may be driven to heat the drum 30.

As shown in FIG. 14, during the filtration operation or during a filtration operation in the circulation operation, as the drum rotates, clothes W may be rotated integrally with the drum 30 while in close contact with the inner circumferential surface of the drum 30. This is because a centrifugal force caused by the rotation of the drum 30 is greater than the gravity. In this case, the circulating water may be injected into the drum 30, and the induction heater 70 may be driven to heat the drum 30.

FIGS. 13 and 14 show a state in which washing water is circulated and sprayed into the drum 30 from an upper part of the drum 30 and a state in which the induction heater 70 (coil 71) is driven to provide a fluctuating magnetic field to the drum 30. An eddy current is generated in the drum by the change of the magnetic field, and heat is generated by the eddy current.

Therefore, as shown in FIGS. 12 to 14, the heater protection water level is destroyed in the entire heating section, so that a water level will always be lower than a lower point of the drum, that is, a circulation level.

Figure 15:
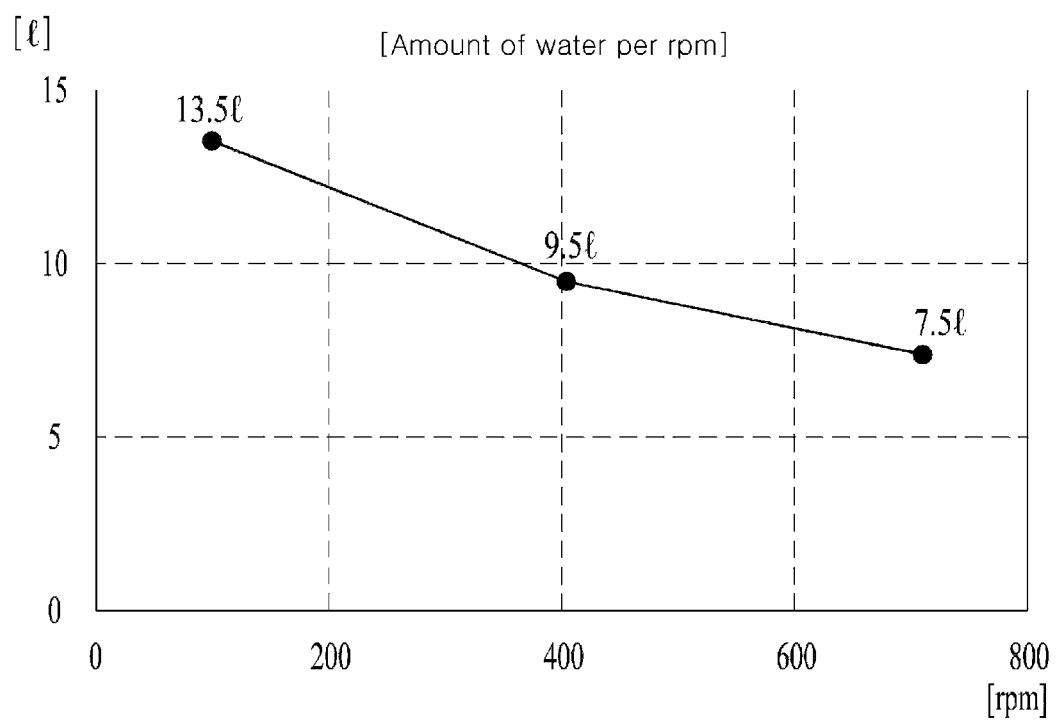
FIG. 15 is a graph illustrating a minimum amount of water per drum rotational speed in a control method of a clothing treatment apparatus according to an embodiment of the present disclosure.
Figure 16:
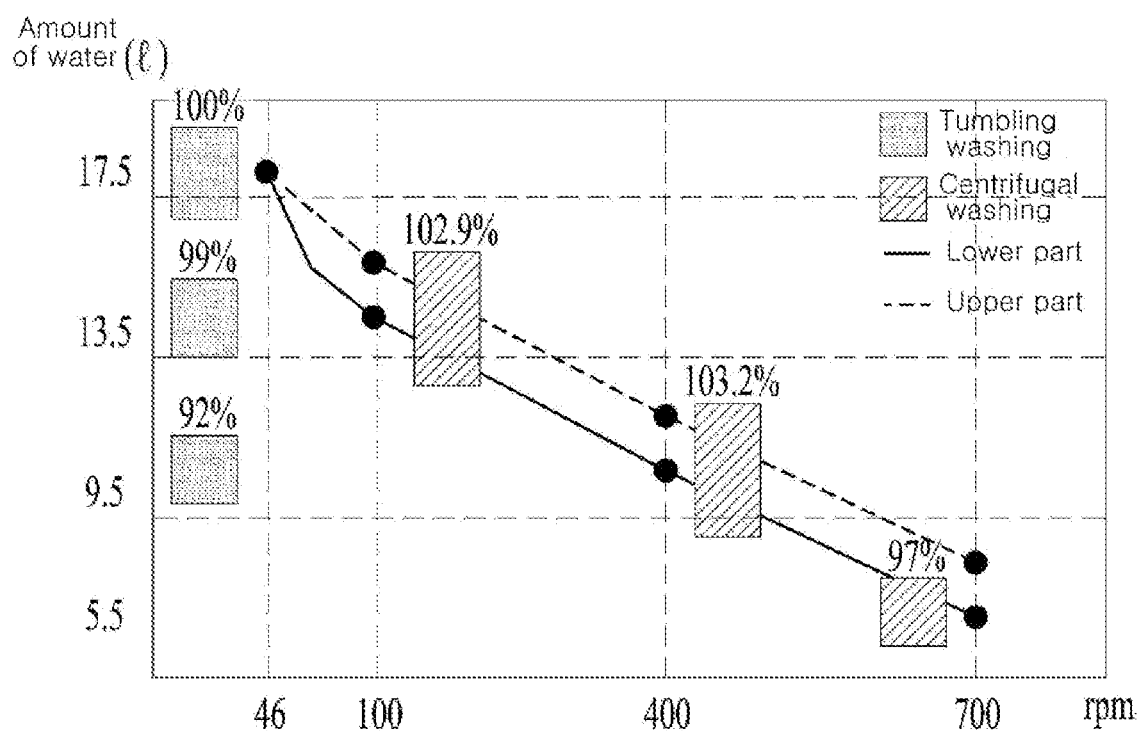
FIG. 16 is a graph illustrating a water level in tumble washing and centrifugal washing in a control method of a clothing treatment apparatus according to an embodiment of the present disclosure.
Figure 17:
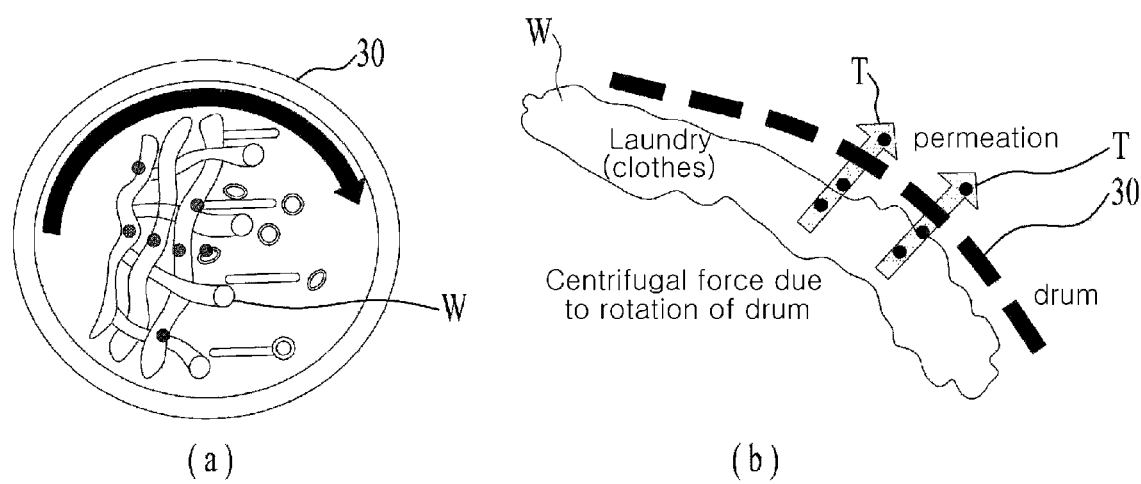
FIG. 17 is a schematic diagram illustrating a process of separation of contaminants by a centrifugal force according to a control method of a clothing treatment apparatus according to an embodiment of the present disclosure.

FIG. 15 is a graph illustrating a minimum amount of water per drum rotational speed in a control method of a clothing treatment apparatus according to an embodiment of the present disclosure. In addition, FIG. 16 is a graph showing water levels in tumble washing and centrifugal washing. FIG. 17 is a schematic diagram illustrating a process of separation of contaminants by a centrifugal force according to a control method of a clothing treatment apparatus according to an embodiment of the present disclosure.

Hereinafter, centrifugal washing according to an embodiment of the present disclosure will be described with reference to FIGS. 15 to 17.

According to an embodiment of the present disclosure, in the centrifugal washing described above, a rotational speed of the drum may be 400 rpm.

In one example, when the centrifugal washing is applied with an existing amount of water under a load having a weight of 6 kg and detergent water comes out of laundry due to a centrifugal force, the water may fill the tub 20 and the drum 30 may hit the water to generate bubbles, thereby degrading washing performance.

Accordingly, in FIG. 15, a minimum amount of water per rpm that does not generate bubbles during the centrifugal washing is measured and shown.

When washing performance is measured with the minimum amount of water per rpm, it can be seen that bubbles are not generated at 400 rpm/9.5 ℓ and the best washing performance is achieved, with reference to FIG. 16.

In FIG. 17, (a) and (b) schematically show a process in which contaminants are separated from laundry W due to a centrifugal force. When the drum 30 is rotated at a high rotational speed (for example, 400 rpm), the washing water may pass through the laundry W and be discharged to the outside of the drum 30, and effective washing may be performed in this process.

One of the important keys to improve washing performance is a detergent concentration and temperature of detergent water. An amount of detergent input may be determined based on an amount of laundry, and how to effectively improve washing performance may be determined based on washing water.

When washing is performed, the clothes may generally contain 200% of washing water depending on the amount of laundry. When it is assumed that the weight of the clothes is 6 kg, 12 ℓ of washing water may be required. An amount of water required to drive the circulation system (Circulation) is 1.5 ℓ and the heater protection water level is about 2 ℓ, so washing is conventionally performed with 15 to 16 ℓ of water in the case of washing 6 kg of clothes.

When it comes to energy requirements, there is a limit to energy (heater) and an amount of detergent is set, so the optimal method may be using less washing water.

In this case, if the washing water is less used, it is possible to achieve the same high concentration effect as when adding more detergent. Therefore, it is possible to achieve a higher washing water temperature with the same energy.

In an existing system, the washing water may be less used by performing filtration at 100 rpm during laundry-wetting, but there is a limit due to the heater protection water level.

In order to increase a rotational speed of the drum to 100 rpm or more, sensing unbalance UB is required. This may be said to use a profile of spin-drying.

In the spin-drying, draining is performed when clothes are somewhat drained, so there may be no major problem, but, in the laundry-wetting, the clothes contain water by 200% water, leading to a possibility of occurrence of unbalance.

Washing time is fixed and contaminants must be removed through bending, stretching, and falling, but washing performance may be deteriorated as an unbalance sensing rotational speed of 108 rpm (with cloth attached) is implemented to perform centrifugal washing time. Therefore, as described above, sensing unbalance may be performed at low rpm.

That is, sensing unbalance (UB) is performed during rotation at 46 rpm (bending, stretching, and falling; in other words, tumbling), and when a condition where clothes can be evenly adhered to the drum and lifted at high rpm is met, the rotational speed may be increased to the high rpm. During this period, the drum operates at 46 rpm, which is tumbling, and in this case, washing performance may be secured. Therefore, it is possible to prevent degradation of washing performance due to high-speed rotation.

As such, since there is no need to maintain a heater protection level when heating is performed, efficient washing may be performed using a minimum amount of water that laundry can contain.

Accordingly, high-concentration washing water may be used, washing time may be reduced due to high temperature of washing water compared to the same energy, and energy saving may be achieved.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A clothing treatment apparatus comprising:
    a tub having a space for accommodating washing water;
    a drum rotatably located inside the tub, the drum being configured to accommodate laundry therein;
    a motor configured to rotate the drum;
    an induction heater located at an outer surface of the tub, the induction heater being configured to heat the drum;
    a water supply valve configured to control a water supply line connecting an external water source to the tub;
    a laundry weight sensor configured to sense an amount of the laundry accommodated in the drum; and
    a controller configured to:
        control the induction heater to heat the drum while controlling the motor to rotate the drum at a first rotational speed at which the laundry accommodated in the drum is rotated to adhere to an inner circumferential surface of the drum; and
        control the water supply valve to supply water in an amount corresponding to twice a weight of the laundry accommodated in the drum,
    wherein the controller is further configured to control the motor to repeatedly rotate and stop while the drum is heated, and
    wherein a sum of times for which the motor is rotated while the drum is heated is greater than a sum of times for which the motor is stopped.

2. The clothing treatment apparatus of claim 1, wherein, when the drum is heated and rotated at the first rotational speed, a water level of the tub is lower than a lower part of the drum.

3. The clothing treatment apparatus of claim 1, further comprising a water level sensor,
    wherein the controller is further configured to control the water supply valve to supply water to the tub before the drum is rotated at the first rotational speed, and
    wherein the water level sensor is configured to sense a water level of the tub after the drum is rotated at the first rotational speed.

4. The clothing treatment apparatus of claim 3, wherein the controller is further configured to, when the water level of the tub is less than or equal to a set water level after the drum is rotated at the first rotational speed, control the water supply valve to supply water in an amount sufficient for the water level of the tub to reach the set water level.

5. The clothing treatment apparatus of claim 3, wherein the controller is further configured to stop the motor after rotating the drum at the first rotational speed, and
    wherein the water level sensor is configured to sense the water level of the tub while the drum is decelerated from the first rotational speed or stopped.

6. The clothing treatment apparatus of claim 1, further comprising:
    a circulation nozzle configured to spray water into the drum;
    a circulation pump configured to supply water discharged from the tub to the circulation nozzle; and
    a circulation passage connecting the tub and the circulation pump and connecting the circulation pump and the circulation nozzle.

7. The clothing treatment apparatus of claim 6, wherein the controller is further configured to drive the circulation pump while the drum is heated and rotated at the first rotational speed.

8. A clothing treatment apparatus comprising:
    a tub having a space for accommodating washing water,
    a drum rotatably located inside the tub, the drum being configured to accommodate laundry therein;
    a motor configured to rotate the drum;
    an induction heater located at an outer surface of the tub, the induction heater being configured to heat the drum;
    a water supply valve configured to control a water supply line connecting an external water source to the tub; and
    a controller configured to:
        control the induction heater to heat the drum while controlling the motor to rotate the drum at a first rotational speed at which the laundry accommodated in the drum is rotated to adhere to an inner circumferential surface of the drum; and
        control the water supply valve to supply water such that, when the drum is heated and rotated at the first rotational speed, a water level of the tub is lower than a lower part of the drum,
    wherein the controller is further configured to control the motor to repeatedly rotate and stop while the drum is heated, and
    wherein a sum of times for which the motor is rotated while the drum is heated is greater than a sum of times for which the motor is stopped.

9. The clothing treatment apparatus of claim 8, further comprising a water level sensor,
    wherein the controller is further configured to control the water supply valve to supply water to the tub before the drum is rotated at the first rotational speed, and
    wherein the water level sensor is configured to sense the water level of the tub after the drum is rotated at the first rotational speed.

10. The clothing treatment apparatus of claim 9, wherein the controller is further configured to, when the water level of the tub is less than or equal to a set water level after the drum is rotated at the first rotational speed, control the water supply valve to supply water in an amount sufficient for the water level of the tub to reach the set water level.

11. The clothing treatment apparatus of claim 9, wherein the controller is further configured to stop the motor after rotating the drum at the first rotational speed, and
    wherein the water level sensor is configured to sense the water level of the tub while the drum is decelerated from the first rotational speed or stopped.

12. The clothing treatment apparatus of claim 8, further comprising:

a circulation nozzle configured to spray washing water into the drum;

a circulation pump configured to supply water discharged from the tub to the circulation nozzle; and a circulation passage connecting the tub and the circulation pump and connecting the circulation pump and the circulation nozzle.

13. The clothing treatment apparatus of claim 12, wherein the controller is further configured to drive the circulation pump while the drum is heated and rotated at the first rotational speed.

14. A clothing treatment apparatus comprising:

a tub having a space for accommodating washing water;

a drum rotatably located inside the tub, the drum being configured to accommodate laundry therein;

a motor configured to rotate the drum;

an induction heater located at an outer surface of the tub, the induction heater being configured to heat the drum;

a water supply valve configured to control a water supply line connecting an external water source to the tub;

a water level sensor; and a controller configured to:
control the induction heater to heat the drum while controlling the motor to rotate the drum at a first rotational speed at which the laundry accommodated in the drum is rotated to adhere to an inner circumferential surface of the drum; and control the water supply valve to supply water to the tub before the drum is rotated at the first rotational speed, wherein the water level sensor is configured to sense a water level of the tub after the drum is rotated at the first rotational speed, wherein the controller is further configured to control the motor to repeatedly rotate and stop while the drum is heated, and wherein a sum of times for which the motor is rotated while the drum is heated is greater than a sum of times for which the motor is stopped.

* * * * *